United States Patent
Freed et al.

(10) Patent No.: US 8,736,228 B1
(45) Date of Patent: May 27, 2014

(54) CHARGING AN ELECTRONIC DEVICE INCLUDING TRAVERSING AT LEAST A PORTION OF A PATH WITH AN APPARATUS

(75) Inventors: Ian W. Freed, Seattle, WA (US); Jeffrey P. Bezos, Greater Seattle Area, WA (US); Keela N. Robison, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 513 days.

(21) Appl. No.: 12/973,759

(22) Filed: Dec. 20, 2010

(51) Int. Cl.
*H02J 7/00* (2006.01)

(52) U.S. Cl.
USPC ............................. 320/115; 320/107; 320/114

(58) Field of Classification Search
USPC ........................... 320/108, 106, 107, 114, 115
See application file for complete search history.

(56) References Cited

U.S. PATENT DOCUMENTS

| | | | |
|---|---|---|---|
| 5,280,622 A * | 1/1994 | Tino ............................. | 700/255 |
| 7,151,366 B2 * | 12/2006 | Renken et al. ........... | 324/750.02 |
| 7,196,719 B2 * | 3/2007 | Koselka et al. ................. | 348/47 |
| 7,531,984 B2 * | 5/2009 | Freed et al. .................... | 320/109 |
| 7,999,506 B1 * | 8/2011 | Hollar et al. ................... | 320/104 |
| 8,212,521 B2 * | 7/2012 | Choi ............................. | 320/114 |
| 8,224,596 B2 * | 7/2012 | Agrawal et al. ................. | 702/63 |
| 8,301,455 B2 * | 10/2012 | Steinbiss ........................ | 704/273 |
| 2005/0134225 A1 * | 6/2005 | Mese et al. ..................... | 320/132 |
| 2005/0221840 A1 * | 10/2005 | Yamamoto et al. ......... | 455/456.3 |
| 2006/0181242 A1 * | 8/2006 | Freed et al. .................... | 320/109 |
| 2007/0278996 A1 * | 12/2007 | So .................................. | 320/107 |
| 2008/0315836 A1 * | 12/2008 | Matsumura et al. .......... | 320/134 |
| 2011/0025265 A1 * | 2/2011 | Mochida et al. .............. | 320/108 |
| 2012/0286730 A1 * | 11/2012 | Bonny ........................... | 320/109 |

FOREIGN PATENT DOCUMENTS

| | | |
|---|---|---|
| WO | WO 2008075358 A2 * | 6/2008 |
| WO | WO 2009122471 A1 * | 10/2009 |

* cited by examiner

*Primary Examiner* — Yalkew Fantu
*Assistant Examiner* — Manuel Hernandez
(74) *Attorney, Agent, or Firm* — Novak Druce Connolly Bove + Quigg LLP

(57) ABSTRACT

A robotic device can provide power management and other functionality for various electronic devices. An electronic device and the robotic device can communicate information such as device charge level, relative position and rate of power consumption and can determine an appropriate time at which the robotic device should cause the electronic device to be charged, either by charging the device directly or transporting the device to an appropriate charger. The robotic device can also cause other functions to be performed as well, such as to enable high-bandwidth data transfer or perform resource-intensive activities when in communication with the electronic device. The robotic device can transport the electronic device to specific locations or to specific users, or as otherwise appropriate.

35 Claims, 12 Drawing Sheets

CHARGING AN ELECTRONIC DEVICE INCLUDING TRAVERSING AT LEAST A PORTION OF A PATH WITH AN APPARATUS

BACKGROUND

People are utilizing portable electronic devices for an increasing number and variety of tasks. It is not uncommon for a user to have a personal media player, notebook computer, cell phone, and electronic book reader, among other such devices. Further, the demands on these devices increase as the devices offer enhanced functionality. For example, a tablet computer or portable gaming platform might perform most, if not all, of the tasks performed by the devices listed above. Thus, the amount of resource and power consumption required by these devices tends to increase, along with the need for the devices to have sufficient power for a user to utilize the devices as necessary.

In many instances, a user will forget to charge a device overnight, which ends up with the device losing power the next day. For tasks that rely upon these devices, not being able to utilize the device when needed can be at least inconvenient to the user. Even in cases where devices provide some indication of low battery power, the devices typically only provide a notification when the device is very low on power, which may be of little use if the user is not near a location where the device can be charged. Further, even when users do remember to charge the device every evening, for example, the consistent amount of "trickle" charging can shorten battery life, which can be particularly problematic for devices that do not utilize replaceable batteries.

BRIEF DESCRIPTION OF THE DRAWINGS

Various embodiments in accordance with the present disclosure will be described with reference to the drawings, in which.

DETAILED DESCRIPTION

Figure 1:
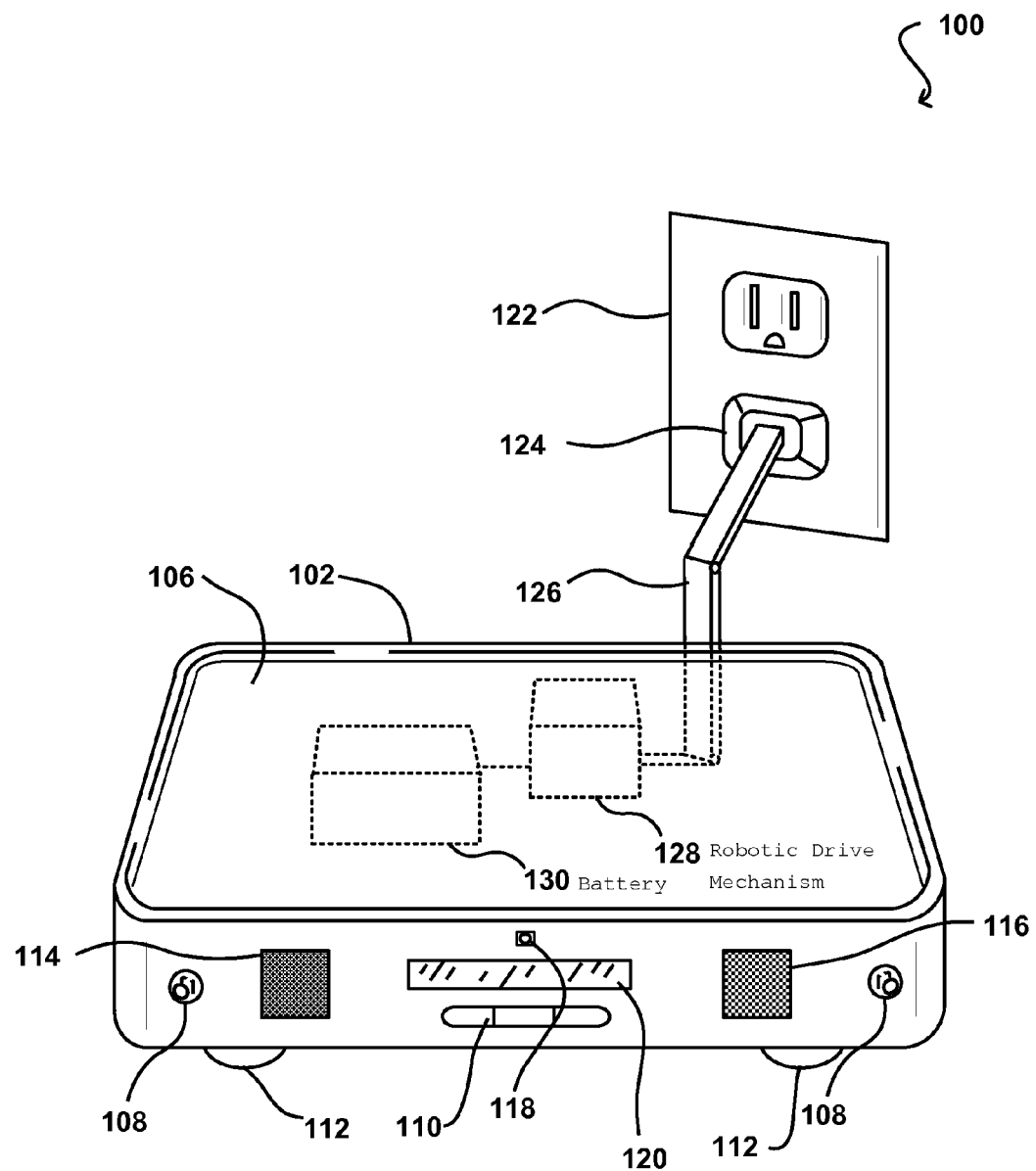
FIG. 1 illustrates a perspective view of an example apparatus operable to charge itself that can be used in accordance with various embodiments.

Systems and methods in accordance with various embodiments of the present disclosure overcome one or more of the above-referenced and other deficiencies in conventional approaches to managing power and other aspects for an electronic device. In many embodiments, an apparatus (also referred to herein as a "robotic device" and/or a "charging device") can locate an electronic device and move to a position near that electronic device such that the apparatus can cause the electronic device to be charged. The apparatus can manipulate a robotic arm or other such mechanical assembly in order to bring an appropriate connector into physical contact with an appropriate port of the electronic device. The apparatus can include at least one power source, such as a rechargeable on-board battery, that can be used to charge the electronic device in place through the physical connection.

A robotic device in accordance with various embodiments can have a drive mechanism and drive controller that are operable to work with other components or services, such as a camera, set of sensors or source of position data, in order to automatically move the robotic device, without human input, to a position near the electronic device. The robotic device can further be operable to position itself in a position relative to the electronic device where the robotic device can bring the charging mechanical assembly into contact with the appropriate port of the electronic device. In other embodiments, the robotic device might utilize the same or a separate mechanical assembly to hold, flip, rotate or otherwise adjust a relative position of the electronic device whereby the robotic device can charge the electronic device. The robotic device can use similar components to cause the robotic device to be recharged as necessary, such as by navigating to a charging element, such as an electronic outlet or docking station, and bringing a robotic assembly into contact with the charging element. When the robotic device is charged and/or the electronic device is charged, or at any other time when the robotic device does not have a pending task, the robotic device can move to a position of rest, such as under a bed or couch, or in any other appropriate location that is preferably out of the way of foot traffic. In some embodiments, the position of rest may also act as a charging location for the robotic device. For example, the position of rest may include a charging pad that is electrically connected to a wall outlet and capable of providing capacitive or inductive charging to the robotic device. The robotic device may position itself on the pad during rest and receive a charge from the charging pad.

The robotic device may be configured to detect when an electronic device is available for charging. For example, when a user of an electronic device is in bed and just finishing use of their electronic device they may lay the device on the floor prior to going to sleep. The robotic device, currently at a position of rest under the bed, identifies the presence of the device and determines whether to charge the electronic device. As described below, the robotic device may identify the presence of the device by receiving a signal from the device, detecting it with an image capture element or otherwise. The robotic device may determine whether to charge the electronic device based on, for example, a power level provided by the electronic device, a predicted duration until the device is again available for charging, etc. If the robotic device decides to charge the electronic device, it will move from the position of rest to the electronic device, connect with the device and charge the device so that it is ready when the user wakes up in the morning. Prior to connecting with the device, the robotic device may also visually identify the device through use of one or more imaging elements on the robot device. By identifying the electronic device, the robotic device can determine which type of connector to use and apply the appropriate level of voltage to the appropriate connector pins. In one embodiment, the robotic device includes a plurality of configurable leads or pins which may be inserted into the electronic device connector to make contact with the appropriate connector contacts/pins. Based upon the identified electronic device type, the robotic device would insert the appropriate pins into the electronic device, making contacts with the appropriate contacts/pins, and apply the correct signals to the electronic device (e.g., provide the correct charging voltage and polarity to the proper pins of the electronic device). Once charging is complete, the robotic device detaches from the electronic device and returns to the position of rest under the bed.

In some embodiments, a robotic device can utilize at least one imaging element in order to recognize an electronic device (or a type of the device). In other embodiments, the robotic device might utilize another signal and/or mechanism, such as an infrared transceiver or sideband signal, in order to identify the electronic device. In situations where a robotic device might have more than one type of connector, a plurality of configurable leads/pins, or other charging mechanism, the ability to identify or recognize the electronic device can ensure that the robotic device utilizes the appropriate connector and charging characteristics (e.g., applying the right amount of voltage to the appropriate connector pins). Likewise, if the robotic device does not have an appropriate connector, the robotic device does not attempt to charge the device. In some embodiments, the robotic device might not be able to recognize or identify the device, but might be able to recognize the connection mechanism (e.g., standard or micro USB port) to be used to charge the device. In certain embodiments, the robotic device will utilize one or more standard charging connectors in order to be able to charge a significant number of devices (e.g., one or more different types of electronic devices). In at least some embodiments, the robotic device can have at least one custom connector designed to be used with certain devices. In alternative embodiments, the robotic device may have a customizable connector or plurality of configurable leads/pins that can be configured to contact the appropriate pins or other connection points of the electronic device, based on the identity of the electronic device. Various other approaches can be used as well within the scope of the described embodiments.

Various other embodiments are provided that can be used for similar and other purposes as well. For example, certain embodiments provide a robotic device operable to transport an electronic device to a charger or docking station or charge or otherwise interact with the electronic device using the robotic device itself, in various situations. In some embodiments, a robotic device can be programmed to only charge the device when certain criteria are met, as may be determined using one or more prediction and/or usage algorithms. A robotic device also can cause other operations to be performed, such as complete a high bandwidth data transfer for a device, which reduces the amount of data that must be transmitted by the device over a lower bandwidth wireless connection. The robotic device can also be programmed or trained to transport the device back to a particular location after the device is charged and/or any of a number of other operations are performed.

In some embodiments, a robotic device is able to obtain information about the power level of an electronic device and perform predictions at various times in order to determine whether the electronic device is likely to need power before a next charging opportunity. In addition to power level, the robotic device may also receive, for example, historical usage patterns of the electronic device, planned future activities of the electronic device user or average discharge rate of the electronic device. Any one or combination of power level, usage patterns, planned future activities and discharge rate can be used to determine whether to charge the electronic device. In some embodiments, the robotic device and/or the electronic device may determine, based on the power level or some other combination of input, whether the current power level of the electronic device meets or exceeds a predetermined threshold. If the power level does not exceed the predetermined threshold, the robotic device predicts that the electronic device needs to be charged. In contrast, if the power level of the electronic device exceeds the predetermined threshold, the robotic device may not charge the electronic device. For example, if the power level of the electronic device exceeds the threshold, it may be determined that the electronic device is unlikely to lose charge/need power in the next 24 hours and thus not need charging until the next day. In this example, the electronic device might be transported by a robotic device to a docking station overnight, where other operations might be performed, but the electronic device may not be charged.

A robotic device can also be programmed to perform different operations based at least in part upon factors such as the current charge on the electronic device and the predicted usage of that electronic device. For example, if the robotic device is programmed to pick up an electronic device placed at a selected location/position (e.g., set by the front door) when the electronic device needs charging, but the electronic device is determined to not require charging at the present time, the robotic device can perform an action such as to leave the electronic device at the same or other selected or defined location/position (e.g., by the door) or transport the electronic device to a location but not cause the electronic device to be charged (i.e., take the electronic device directly to the end point without first stopping at a charging location).

The robotic device can also communicate with the electronic device to determine a location and/or orientation of the electronic device in order to move to the determined location and be able to approach the electronic device from an appropriate direction to obtain and/or transport the electronic device. The robotic device can also have the ability to map the surroundings, recognize objects and users and receive voice or other types of commands in order to perform a variety of other functions. For example, the robotic device can be trained to bring the electronic device to a user in the event of a notification or appropriate event. Further, the robotic device can be trained to work with multiple electronic devices for multiple users and perform different functions for each. Various other types of functionality can be performed as well within the scope of the various embodiments.

Further, an electronic device, robotic device, charger, docking station or other such component can communicate with a system or service over an appropriate network, such as the Internet, in order to enable the processing, predictions and various determinations to be done remotely, thus reducing the amount of resources and processing needed on those components, which can help to lower the cost of the components and enable upgrades and other adjustments to be made without user interaction.

A robotic device can also be configured and/or programmed to provide various other types of functionality for an electronic device as well. For example, an electronic device might perform any of a number of high-bandwidth data transfers, such as to download music or software updates, or to upload various types of information. In situations where the electronic device might utilize a relatively low-bandwidth wireless connection, the electronic device and robotic device can communicate such that the transfer is done via a faster Wi-Fi or hardwire connection, or the robotic device may move the electronic device to another location that has better wireless reception. For example, the robotic device could take the electronic device to a docking station that has a wired connection to the Internet, whereby the device can utilize the higher bandwidth connection to perform the transfer. In some cases, the docking station can also provide power to the electronic device such that the transfer does not drain the battery of the electronic device. The transfer can be done separately, or concurrently, from charging or other such actions. If the robotic device is able to determine the type of transfer, the robotic device can also be configured to connect the device to the appropriate component. For example, if the electronic device is to download a media file from a digital video recorder, the robotic device can carry the electronic device and cause that electronic device to be connected to that recorder, at least for the amount of time necessary to transfer the file. For other types of transfers, the electronic device can be connected to a computer, video game console or other such component. While such transfers can often be done wirelessly, a direct connection can be much faster and less resource intensive. Even in situations where a direct connection might not be faster than a wireless connection, for example, certain operations such as device synchronizations can be performed via the direct connection in order to reduce the amount of battery consumption.

FIG. 1 illustrates an example of a robotic device 100 that can be used in accordance with at least one embodiment. In this example, the robotic device includes a substantially rectangular-shaped housing 102 with a substantially planar top surface 106 and rounded edges to minimize damage in the event the robotic device comes in contact with an object, person or other surface. The shape and size of the housing, however, can vary among the different embodiments. The housing can be made of an appropriate material, such as a lightweight and durable material (e.g., plastic) in any appropriate number of connectable pieces. The housing in this example is supported by three or more wheels 112, which can include at least one drive wheel and at least one steerable wheel (which in some embodiments can be the same wheel). While wheels are used for purposes of explanation, it should be understood that any suitable transportation mechanism such as bearings, treads, arms, legs, bands, fans or other such mechanisms can be used within the scope of the various embodiments. The housing 102 also includes a plurality of sensors 108 positioned around a periphery of the robotic device, although at least one sensor or camera with a wide angle lens or other such device could be used as well in other embodiments. In this example, the robotic device includes four ultrasonic sensors 108 positioned about an edge of the housing which can indicate to the robotic device when it is nearing a particular surface, such that the robotic device can avoid inadvertently colliding with something or someone.

The robotic device also includes at least one imaging device (e.g., a camera) 118, which can be included with the sensors or as at least one separate element. The camera can have a wide angle lens enabling the robotic device to capture images over a substantially large field of view, and in some embodiments the robotic device can have multiple cameras enabling the robotic device to see in substantially any direction. If the robotic device has a single camera, that camera can designate a "front" of the robotic device when it is navigating, such that the robotic device can view the area in which it is intending to move. The robotic device thus can be designed to rotate in place in order to turn, move in different directions, etc., while positioning the camera in substantially the direction of movement. If multiple cameras or other such elements are included, the device might be able to move in any direction regardless of its current orientation (at least with respect to the viewable area of any given camera).

The robotic device 100 in this example includes a charging assembly enabling the robotic device to recharge itself as necessary. The example charging assembly includes a mechanical arm assembly 126 including a charging connector 124 shaped to be received by an electrical outlet 122 or other appropriate source of power. The assembly includes at least one robotic drive mechanism 128 operable to direct the arm 126 to position the connector 124 with respect to the outlet 122 and insert the connector as necessary. When the robotic device is charged or needs to move to another location, the robotic drive mechanism 128 can cause the connector to be removed from the outlet and the arm assembly 126 retracted to a rest position, such as a position within the housing 102 of the robotic device. The connector 124 and arm assembly 126 each can have a power transmission mechanism (e.g., a cable or set of wires) disposed therein or connected thereto in order to transmit power from the outlet 122 to at least one rechargeable battery 130 or other power storage mechanism. In some embodiments, there is one or more rechargeable batteries for the robotic device, while in other embodiments there is at least one battery used to power the robotic device and at least one battery used to charge other devices. It should be understood that while the connector 124 shown is configured to be received by a conventional electrical outlet within a given vertical distance from the robotic device, there can be other connectors used as well, such as to connect to a charging station or other appropriate power source. In some embodiments, the connector 124 can be a connector in common with a connector used to charge another device, such that in some embodiments only one connector is used to both charge the robotic device and other devices.

In some embodiments, the robotic device can utilize the camera 118 and sensors 108 in a new environment to attempt to generate a mapping of that environment. In some embodiments the robotic device can perform a mapping any time the robotic device detects an unexpected or unknown layout. In other embodiments, a user can interact with the robotic device in order to request that the robotic device perform a mapping of the environment. In this example, the user is able to interact with the robotic device using a display screen 120 capable of providing text or graphical output to the user, as well as one or more buttons 110 or other input elements of the robotic device. For example, the user might select a "menu" button on the side of the robotic device, which will cause one or more menu items to be listed on the display 120. The user can scroll through the menu options using one or more of the buttons 110 until a "map new environment" or similar option is displayed. When the user selects such an option and the robotic device is set on an appropriate surface (or after a set delay or other appropriate criterion), the robotic device can first capture image information around the device using the one or more cameras 118 and can detect any nearby surfaces and approximate distances to those surfaces, using the one or more sensors 108. In at least some cases, the sensors can be configured to substantially detect horizontal surfaces or surfaces that might contact the robotic device and substantially ignore the floor, ceiling and other such surfaces. In some embodiments, the robotic device will "spin" or otherwise move in order to image approximately three-hundred and sixty degrees about the robotic device. In some embodiments the robotic device utilizes a digital camera that captures a plurality of still images, which then are analyzed to detect specific items or objects, etc. In other embodiments, a video camera can be used to capture such information. In some embodiments, the robotic device will include an orientation-determining element such as an accelerometer or digital compass to associate a direction (absolute or relative) with an imaged item or location. For example, the robotic device can always track its orientation with respect to an initial orientation where the mapping began using an accelerometer, or the robotic device can use a combination of items such as a global positioning system (GPS) and digital compass to determine absolute position and direction for use in mapping the environment.

In this example, the robotic device analyzes the nearby environment and selects an initial direction of travel for the mapping. For example, if the robotic device is near a corner of the room, the robotic device might move to the corner of the room and then start along a wall in one direction in order to generate the mapping while covering an intelligently selected path covering a minimal distance. In other embodiments, the robotic device might move in a random direction, or along a random path, and capture images along the way. If the robotic device is determining an appropriate path, the robotic device might stop each time the robotic device enters a new room or area, image the entire viewable area and determine a path along which to travel to map the area. In other embodiments, the robotic device moves in one direction until it nears a surface (or in some embodiments contacts a surface), then changes direction and moves in that direction. Such an approach can provide random movements and directions, or at least movements and directions that are not pre-determined, but over time will cause the robotic device to cover essentially the entire area.

While the robotic device is mapping, the robotic device can stop at any appropriate time or location to image a new area or can image while moving. The sensors can be used with the camera to detect distances and object sizes/shapes, and any of this and other such information can be used with the position information of the robotic device to generate mapping information. In some embodiments, the robotic device will continue the mapping process until an entire bounded area (e.g., the entire downstairs of a house) has been mapped. Various other stopping criteria can be used as well. In some embodiments, the robotic device can restart at least a portion of the mapping process any time an unexpected object or surface is encountered, such as when furniture is rearranged. In other embodiments, a robotic device will only begin remapping when directed by a user. Such an approach might be used to prevent the robotic device from re-mapping each time someone sets a pair of shoes on the floor, the family pet sits on the floor or any other temporary surface is presented. In some embodiments, the robotic device can emit a noise or other signal or request indicating that the robotic device encountered a new surface, or can send a message to another user device (e.g., phone or computer) with a picture of the surface, asking whether the surface should be included in the mapping. Such an approach might not be ideal in all situations, however, as the number of such communications can be annoying to certain users. In some embodiments, any of these types of notifications can be configurable by the user and can even be turned off.

In still other embodiments, the robotic device may receive some or all of the mapping information from another source. For example, if there are two (or more) robotic devices at a location, those devices may share mapping information. This could be mapping information generated solely by one of the devices and shared with the other or mapping information generated by both devices, combined and shared. Also, other devices that are capable of mapping segments of a room, such as electronic devices with a camera, may be used to collect mapping information for portions of a location.

When the robotic device has completed mapping an area, the robotic device can store mapping information in an appropriate location, such as flash memory, or can transmit the mapping information to a home station, remote service via an Internet or other wireless location or other such storage mechanism. The robotic device can attempt to recognize certain objects, such as couches and chairs, where users might be at certain times and distinguish these from televisions, end tables and other such objects. In some embodiments, the robotic device will use image analysis algorithms and other such processes to attempt to determine types of objects and/or likely locations of users. In other embodiments, the robotic device can communicate with a user to obtain such information, such as by interfacing with a Web page accessible by a user to enable the user to view images or mapping information and input certain types of requested information, such as to input a type of an object, confirm a mapping determination, etc. In some embodiments, the robotic device might be able to display this information to the user on the display mechanism 120 of the robotic device and enable the user to confirm or deny certain determinations, input alternative information, etc.

The robotic device in this example also includes a microphone 114 or other audio capture element for accepting input such as voice commands or phone-originating noises, as well as a speaker 116 for generating audio output such as signals, beeps, music, recorded audio, computer-generated speech and the like. The robotic device can utilize one or more speech recognition algorithms or can otherwise be trained or programmed to recognize specific voices and/or voice commands. For example, if guests are coming over and users do not want the robotic device accidentally getting underfoot, a user can speak a command such as "go to sleep" and the robotic device can move to a designated "sleep" location and not move until a subsequent "wake up" or similar command is given. The robotic device can have a specific rest or "home" position (e.g., under a piece of furniture), which might be a location in which the robotic device can recharge its batteries or at least be out of the way. The speaker can be used to emit audio output to a user, for any of a number of reasons discussed elsewhere herein.

As mentioned above, the robotic device can have a wireless communication mechanism (not shown) that enables a user to communicate with the robotic device using any appropriate computing device with an appropriate network connection. For example, the robotic device can have a Wi-Fi, Bluetooth® or cellular connection, which can enable the robotic device to connect to a network such as the Internet. In such a case, a user might be able to access a particular Web page or Web site (or other such location) in order to communicate with the robotic device. As discussed, the user can confirm mapping and other types of information determined by the robotic device. The user also can specify various other types of information, such as actions to be performed by the robotic device, hours during which to be active, areas of a house or office to be avoided or any of a variety of configuration information.

While not discussed or shown in detail, it should be understood that a robotic device in accordance with the various embodiments can have a variety of other mechanisms and devices as well, used for a variety of different purposes. For example, the buttons on the robotic device can include any appropriate buttons, such as on/off buttons, "sleep" or "wake" buttons, mode buttons, volume buttons and the like. The robotic device can also include a battery compartment that might contain at least one removable and/or rechargeable battery or other such power element. The robotic device can also include a slot for a removable and/or upgradeable memory card, which can be used to store information such as user image information, mapping information and the like. In some embodiments, the robotic device can also store music, audio, video and/or other such information that can be played while the robotic device is active.

As discussed above, a robotic device in accordance with various embodiments can be used to charge at least one type of electronic device. For example, FIG. 2(*a*) illustrates an example environment 200 wherein an electronic device 202 is positioned on a surface that can be reached by the robotic device 100, such as on the floor or on a surface of at most a maximum reachable height. The robotic device 100 can utilize at least one image capture element 118, having a given viewable range 204, as discussed above, to capture image information that can be analyzed to determine information such as a type and a relative position of the electronic device 202 with respect to the robotic device. As mentioned, determining the type of the electronic device (or at least a connector of the electronic device) enables the robotic device 100 to determine whether the robotic device can charge the electronic device and, if so, which connector and settings should be used to charge the device (for embodiments with more than one connector). The ability of the robotic device to determine a relative position of the electronic device also enables the robotic device to ensure not only that the robotic device automatically moves, without human input, sufficiently near to the electronic device to charge the electronic device, but also that the robotic device is sufficiently facing the charging port 206 of the electronic device. As discussed elsewhere herein in more detail, this can include the robotic device maneuvering to face the appropriate side of the electronic device or moving to a position near the electronic device then rotating or otherwise adjusting a position of the electronic device as necessary.

In some embodiments, the robotic device 100 can maneuver periodically around an area to attempt to locate devices to be charged. In other embodiments, an electronic device 202 can send a communication that the device needs to be charged, etc. For example, the electronic device might communicate with the robotic device by emitting an audible tone or sending a communication over a wireless channel such as Wi-Fi or Bluetooth®, and if the electronic device determines that it should be charged, then the electronic device can send a request to the robotic device. In at least some embodiments, the electronic device can attempt to determine an approximate location of the electronic device, as discussed in more detail later herein, in order to assist the robotic device in locating the electronic device.

Figure 2A:
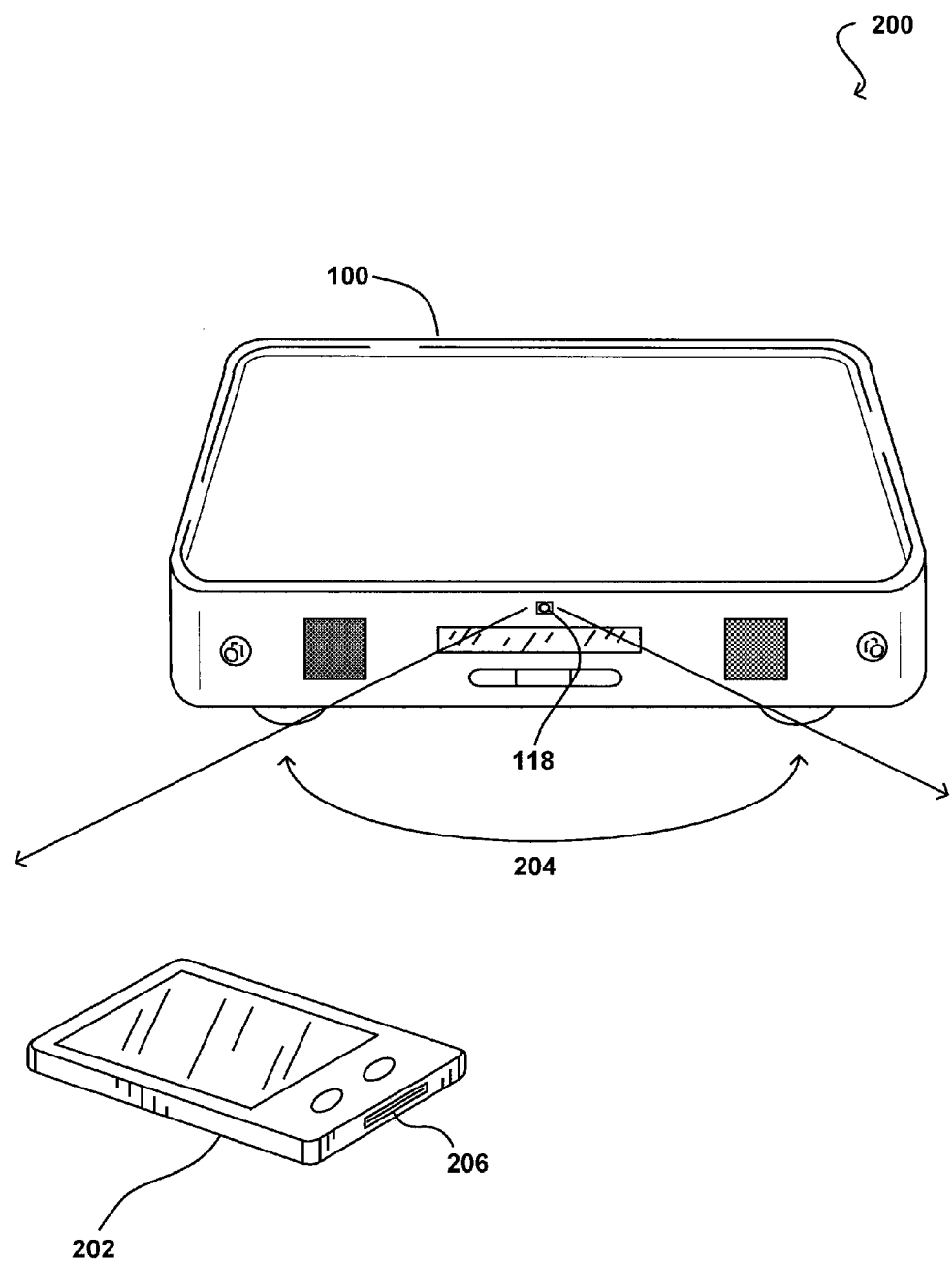
FIGS. 2(a) and 2(b) illustrate perspective views of an example apparatus operable to locate and charge an electronic device that can be used in accordance with various embodiments.
Figure 2B:
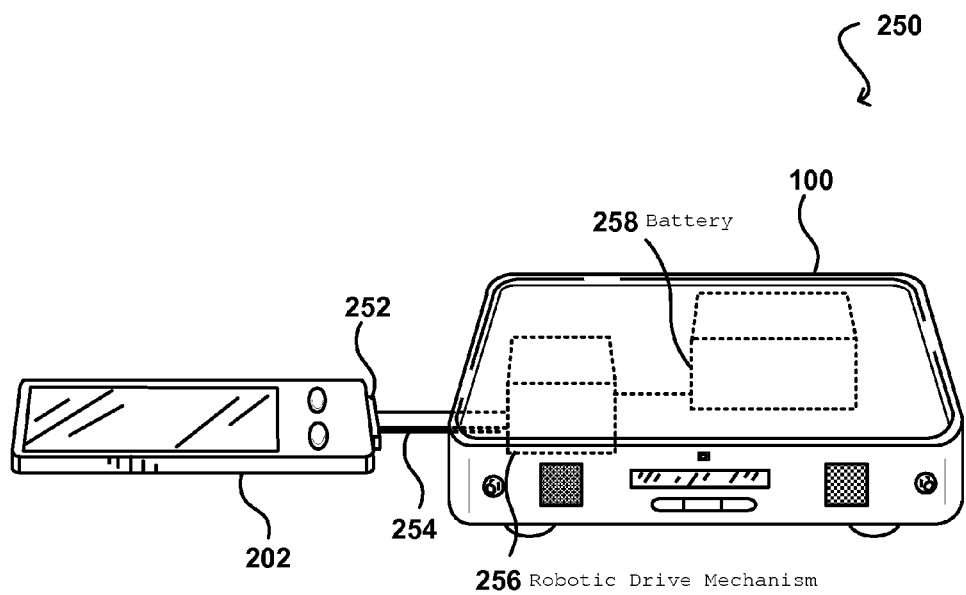

Once the robotic device 100 has determined that the electronic device 202 can be charged and causes the electronic device to have an appropriate relative orientation and distance for charging (through movement of the robotic device, electronic device or both), the robotic device can attempt to connect to the electronic device as illustrated by the arrangement 250 of FIG. 2(*b*). In this example, the robotic device is illustrated to include a single connector 252, but it should be understood that in other embodiments a robotic device can include multiple connectors, which can be attached to the same robotic assembly or different robotic assemblies in different embodiments. Alternatively, the robotic device may include a customizable connector or plurality of configurable leads/pins that can be configured based on the type of electronic device that is to be charged. In addition, the robotic device may include a mechanical assembly or arm that can hold the electronic device stationary while connection with the port 206 is made. In alternative embodiments, the connector 252 may provide capacitive or inductive charging, thereby not requiring a physical connection. In this example, the robotic device includes a robotic drive mechanism 256, which can include similar or separate components to the drive mechanism 128 discussed with respect to FIG. 1 for charging the robotic device. The robotic drive mechanism can manipulate a robotic arm assembly 254 or other such mechanism to position the appropriate connector 252 with respect to the port 206 on the electronic device 202 and cause the connector to move into, and be received by, the charging port 206. The connector 252 and arm assembly 254 can include, or provide, a power transmission mechanism such as a cable or set of wires (not shown) to transfer power from a battery 258 or other such power source to the electronic device 202. When the electronic device 202 is charged to at least a determined level, the robotic drive mechanism 256 can cause the robotic arm assembly 254 to retract the connector 252 from the electronic device and move into an appropriate rest position, such as inside the housing 102 of the robotic device 100. As mentioned previously, the battery 258 can be the same battery used to power the robotic device 100 or can be a separate battery used to charge other devices.

In an alternative embodiment, the robotic device 100 may carry one or more additional electronic device power sources, such as a battery (not shown) for the electronic device, that can be used to replace the power source on the electronic device 202. In such an embodiment, the robotic device 100 may be configured to remove the power source from the electronic device and replace the removed power source with the additional electronic device power source carried by the robotic device 100. For example, the robotic arm assembly 254 may be used to remove the electronic device battery and replace it with another appropriate battery carried by the robotic device 100. The removed electronic device power source (e.g., battery) may then be charged by the robotic device 100 or moved to a remote charging location.

Figure 3:
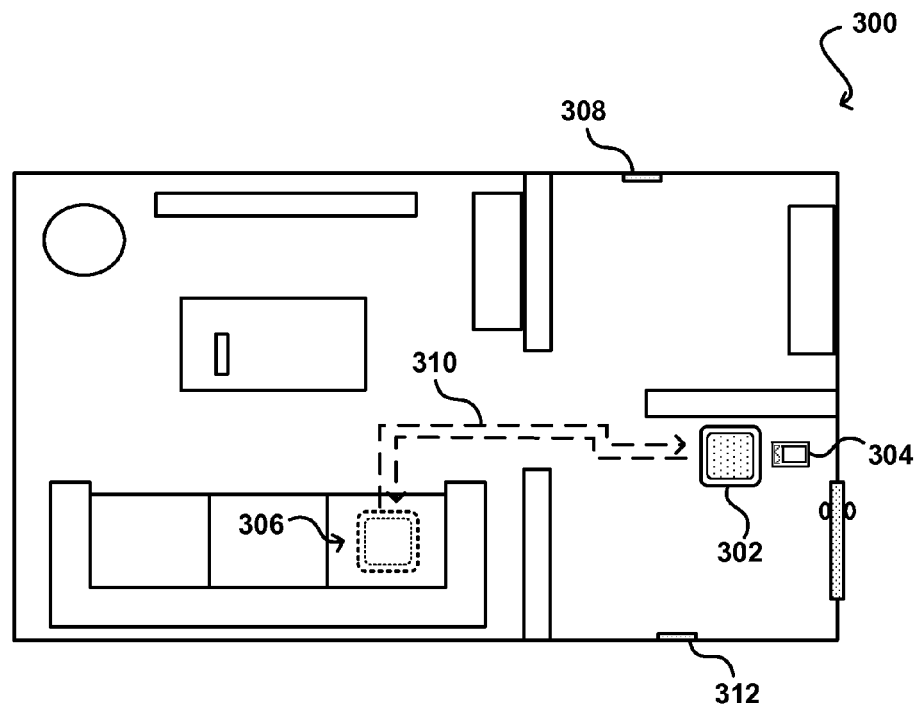
FIG. 3 illustrates an example environment and situation in which an apparatus can operate to charge an electronic device in accordance with various embodiments.

FIG. 3 illustrates an example situation 300 wherein a robotic device 302 is able to move from a position of rest 306 to an electronic device 304 and charge the electronic device 304, in accordance with at least one embodiment. In this example, a user has placed an electronic device 304 on the floor near their bed. A robotic device 302 is positioned at a designated rest position 306, in this case under the bed, connected to outlet 307. In this example, the robotic device 302 detects the presence of the device 304, such as by receiving a signal from the device, passing by that location on a specific path at a specific time, by randomly viewing the device while the robotic device is moving through the environment or using any other such approach. If the robotic device has been configured to charge the device at a specific location, or if the electronic device 304 transmits information about its location, for example, the robotic device can determine an appropriate path 310 to take from the rest position 306 of the robotic device to the electronic device 304 based at least in part upon the mapping information stored in the robotic device (or otherwise accessible). In one embodiment, the robotic device determines a current location using GPS data or other information discussed herein and compares the current location and the electronic device location with the mapping information. In other embodiments, the robotic device may receive an image captured by the electronic device 304 and compare that image with the mapping information to identify the electronic device's location.

Once the location of the electronic device is determined, the robotic device can determine a path by considering any walls or other obstructions between the current location and the destination, as well as a minimum distance from obstructions needed for the robotic device to pass, and then can generate a path that can be the shortest, fastest or easiest path, or that meets another such criterion. In some embodiments, the robotic device can use the same or a similar path 310 in reverse in order to move back to the rest position once the electronic device is charged. In addition, if the robotic device is away from the position of rest 306 and needs to be charged, or if the position of rest does not provide the ability for the robotic device to recharge itself, the robotic device can utilize a similar approach to determine a path (not shown) needed to move the robotic device to a position where the robotic device can be charged, such as a position near an electrical outlet 308. In some cases, the robotic device might map the location of multiple outlets, such that if a first outlet 308 is not available, the robotic device can move to a position near another outlet 312. In some embodiments there can be a hierarchy of outlets, such that the robotic device first attempts to use an outlet that is not frequently used for other purposes, and in some embodiments the robotic device attempts to use the outlet closest to its current position. In some embodiments, the robotic device can be operable to unplug a device (where allowed or enabled) in order to plug itself in, particularly when the robotic device will otherwise run out of power. Various other approaches can be utilized as well within the scope of the various embodiments. Once a path is determined, the robotic device automatically moves along at least a portion of the path to a location near the electronic device. The robotic device is capable of moving along the path without human input.

In some embodiments, the electronic device 304 can notify the robotic device 302 of its location and/or the need for the device to be charged. For example, in one embodiment the electronic device and robotic device can communicate via a wireless connection such as Bluetooth, such that when the electronic device and robotic device detect each other as being within range, the robotic device can move toward the electronic device. The electronic device can send position updates based on GPS or accelerometer data or any other appropriate communication can occur. In other embodiments, the robotic device and/or electronic device might include a mapping feature that learns locations over time that can be used to enable the robotic device to locate the electronic device. For example, instead of sending coordinates that might be imprecise indoors, the electronic device might instruct the robotic device that the device is "on the kitchen table" or "near the refrigerator," whereby the robotic device can move near that location and then locate the electronic device using image or other such information. The identities of these locations can be determined using any appropriate approach, such as image analysis, user input, behavior monitoring, etc.

Figure 4:
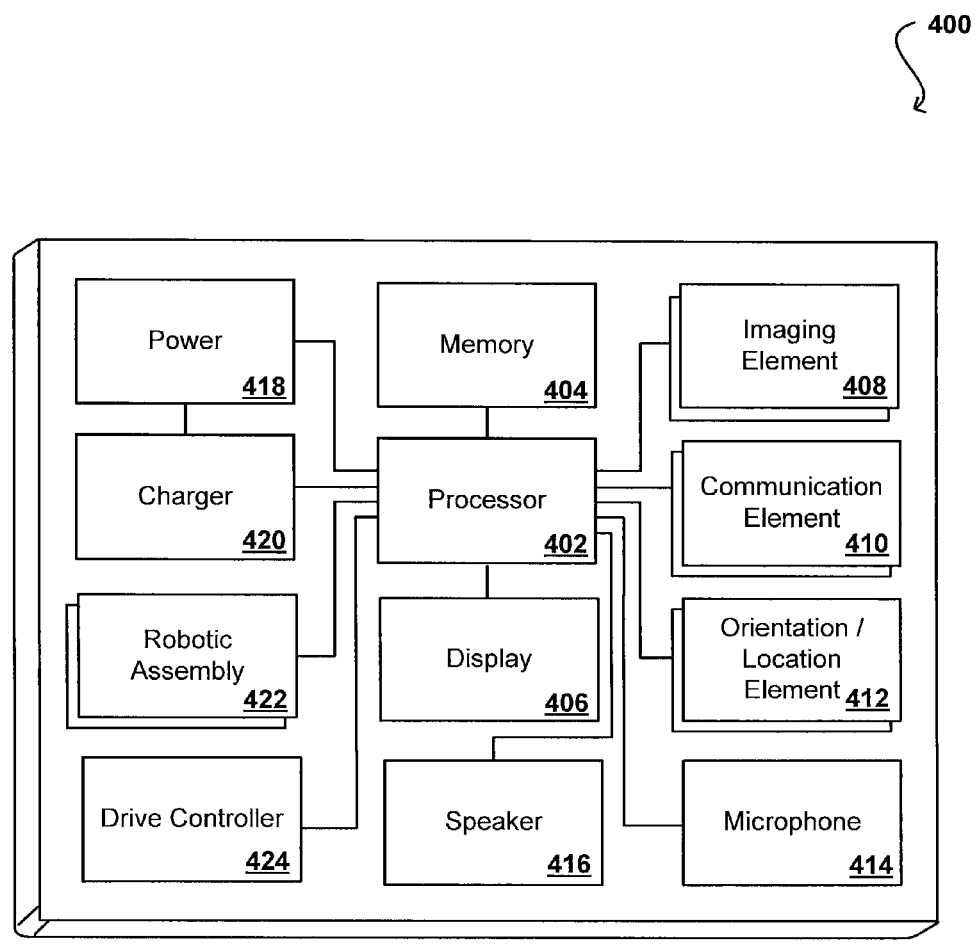
FIG. 4 illustrates an example configuration of components of an apparatus that can be used in accordance with various embodiments.

FIG. 4 illustrates a logical arrangement of a set of general components of an example robotic device 400, such as the robotic device 100 described with respect to FIG. 1. In this example, the device includes at least one processor 402 for executing instructions that can be stored in a memory device or element 404. As would be apparent to one of ordinary skill in the art, the device can include many types of memory, data storage or non-transitory computer-readable storage media, such as a first data storage for program instructions for execution by the processor 402, a separate storage for images or data, a removable memory for sharing information with other devices, etc. In some embodiments, the memory 404 can act as an external hard drive for the device, enabling the device to offload data that has not been accessed frequently or perform other such data storage. The robotic device typically will include some type of display element 406, such as a liquid crystal display (LCD), which can be associated with any of a number of input elements as discussed elsewhere herein. The device in many embodiments will include at least one imaging or image capture element 408, such as a camera or infrared sensor that is able to image users, surfaces or other objects in the vicinity of the robotic device. Methods for capturing images or video using a camera element are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device.

The robotic device can also include at least one communication element 410, such as a Wi-Fi, Bluetooth, Radio Frequency (RF) or other wireless communication system. As discussed elsewhere herein, such a communication element can enable the robotic device to communicate with any electronic device capable of being utilized, transported or charged by the robotic device. The communication element(s) can also enable the robotic device to connect to a network, such as a local area network (LAN) or the Internet, which can enable a user to program, monitor or otherwise interact with the robotic device. In some embodiments, the network connection can be used to store information to a remote location, such as to back up an image or other state of the device to a location in a compute cloud or remote data center. The device then could potentially be restored from the remote storage and/or the storage in the robotic device itself. The robotic device can also include one or more orientation and/or location determining elements 412, such as an accelerometer, gyroscope, electronic compass or GPS device. These elements can be in communication with the processor in order to provide the processor with positioning and/or orientation data. This data can be used to assist in determining paths to specific locations, as well as orientations needed to interact with specific physical electronic devices.

In some embodiments, the device can include at least one additional input device able to receive conventional input from a user. This conventional input can include, for example, a push button, touch pad, touch screen, wheel, joystick, keyboard, mouse, keypad or any other such device or element whereby a user can input a command to the device. In some embodiments, however, such a device might not include any buttons at all, and might be controlled only through a combination of visual and audio commands, such that a user can control the device without having to be in contact with the device.

The example robotic device 400 also includes a microphone 414 or other audio capture device capable of capturing audio data, such as words spoken by a user of the robotic device. In at least some embodiments, the microphone can be an omni-directional microphone that captures sound information from substantially any direction about the robotic device. As discussed, in some embodiments the robotic device contains more than one microphone that can be used to attempt to determine a location of a user speaking a command. The robotic device also includes at least one speaker 416 in communication with the processor and enabling the robotic device 400 to issue audio commands or notifications as discussed elsewhere herein.

The example robotic device 400 includes a drive controller 424, which receives commands from the processor 402 and is able to move, translate or otherwise manipulate a current position of the robotic device. In some embodiments, this can include a spindle motor, brush motor or other such device capable of applying movement to at least one drive wheel or other motion-inducing element of the robotic device. The robotic controller can also include, or be in communication with, a steering mechanism such as a rotatable drive wheel for directing the robotic device during movement. In some embodiments, the wheels or other motion elements of the robotic device can rotate or otherwise move in order to spin the robotic device in place, in order to adjust a direction in which the robotic device is facing. As discussed, the robotic device in at least some embodiments also includes at least one robotic assembly 422, including at least one robotic controller operable to receive commands from the processor and manipulate the robotics according to those commands. It should be understood that the robotic controller, drive controller and other such elements of a robotic assembly also can send information back to the processor in order to provide any necessary information for the processor to make adjustments, etc. The robotic device can include multiple robotic assemblies, such as one assembly for charging the robotic device and one assembly for charging the electronic device, although a single assembly can be used for both purposes in at least some embodiments. In some embodiments, multiple connectors can be made available to charge different types of devices or devices having different types of ports.

The robotic device also includes at least one power supply or power source 418, which may comprise a rechargeable battery and/or other such components. The robotic device also can include at least one charging mechanism 420, which can include components and/or circuitry to enable power to be passed between a robotic assembly, connected to a device or outlet, for example, and an appropriate battery of the robotic device. The charger can direct power as appropriate and can terminate the flow of power when no longer needed, such as when the robotic device or a device are substantially fully charged. It should be understood that various additional, fewer or alternative components can be utilized in similar or alternative configurations within the scope of the various embodiments, as would be apparent to one of ordinary skill in the art in light of the teachings and suggestions contained herein.

Figure 5:
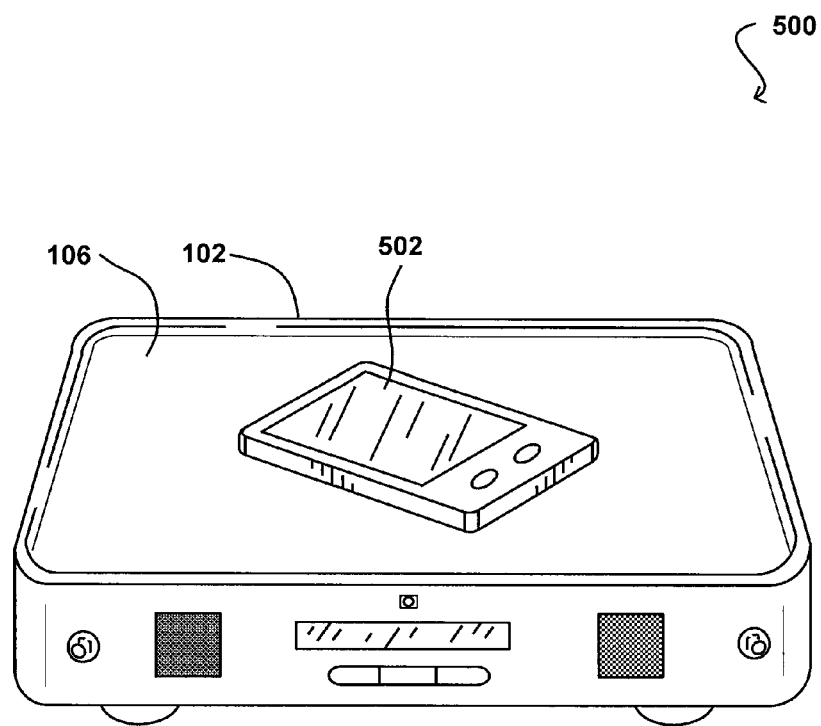
FIG. 5 illustrates a perspective view of an example apparatus that can be used in accordance with various embodiments.

While a robotic device can utilize a robotic assembly to charge a device as discussed with respect to FIG. 2(*b*), it should be understood that other charging approaches can be used as well within the scope of the various embodiments. For example, a robotic device can be configured to capacitively or otherwise charge an electronic device positioned on, near or under the robotic device as illustrated in the example configuration 500 of FIG. 5. Similar numbers are used for similar components of the example robotic devices, but it should be understood that such use is to assist with the clarity of explanation and should not be interpreted to limit the description to a single embodiment. The shape and/or size of the robotic device 102 can be such that at least one type of electronic device 502 can be positioned on the upper surface 106 of the robotic device. In this example, the upper surface 106 is shaped and sized to be able to accept and/or support a portable electronic device 504, such as an electronic book reader, personal data assistant and the like. In some embodiments, such a design enables the robotic device to be able to at least transport the electronic device to one or more areas according to the mapping. In other embodiments, the upper surface 106 is a portion of a capacitive charger, or other such device or mechanism capable of charging a device positioned on (or within proximity of) that surface without otherwise connecting or "plugging" the device into the robotic device.

In an alternative embodiment, the bottom surface of the robotic device 102, or a portion thereof, may be a capacitive or inductive charger. In such an embodiment, the robotic device 102 can position itself over and charge the electronic device 502 without having to pick it up or otherwise move the electronic device 502. For example, the robotic device 102 may move to a position over the electronic device 502 and either lower itself down onto the electronic device 502 or lower a portion of the bottom surface of the robotic device 502 that includes the charger down onto the electronic device 502 and charge the electronic device 502. The charger may be positioned using information from an imaging element or a signal from the electronic device 502 (e.g., when electronic device 502 begins charging, it may transmit a signal to the robotic device 102).

Various methods of charging devices through contact and/or proximity are known in the art and will not be discussed herein in detail. Any appropriate charging method known or subsequently developed can be used as well in various embodiments. The capacitive surface enables a user to set an electronic device on the robotic device, and the robotic device can automatically charge the device. In some embodiments, the robotic device can have one or more sensors (not shown) that can detect the presence of the device. In other embodiments, the electronic device and robotic device can communicate information such as position and battery life to begin or end the charging process. The upper surface can also have a lip or edge such that a device being charged on, or carried by, the robotic device will not fall off the robotic device during movement of the robotic device.

Figure 6:
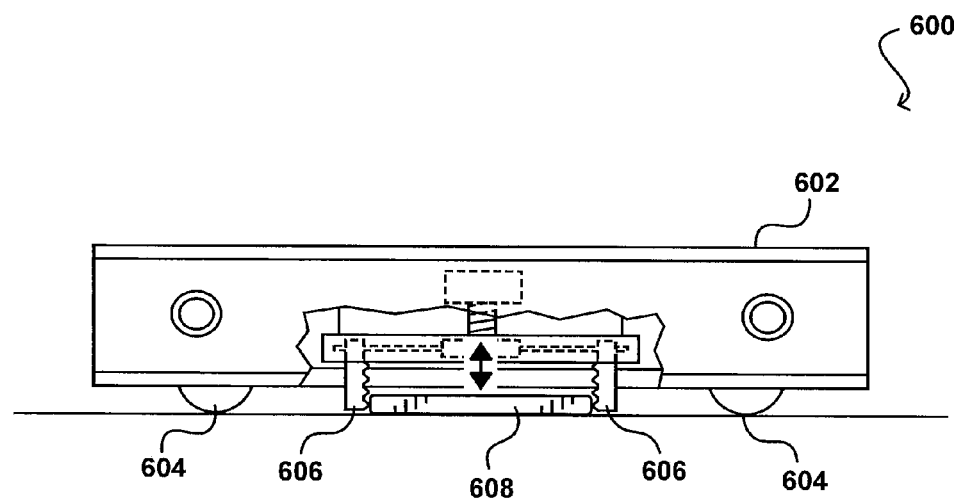
FIG. 6 illustrates a side view of an example apparatus that can be used in accordance with various embodiments.

In some cases, however, the robotic device might not be in a position to have the user place the device on the robotic device. In other cases, the user might simply prefer to place the device on the floor (or another appropriate surface) when the user enters a home or office, finishes a call or task or at any other appropriate time. Accordingly, robotic devices in accordance with various embodiments can also have the ability to "pick up" or otherwise access devices that are not otherwise placed on the robotic device by a user or other entity. For example, FIG. 6 illustrates an example robotic device 600 that is configured to be able to position itself substantially over at least a part of such an electronic device 608. In this example, the housing 602 is positioned at a height that enables the robotic device to drive over the top of the electronic device 608 using wheels 604 or another movement mechanism. In other embodiments, there can be an opening in at least one side of the housing such that the housing can be lower but the device can still be accepted into the opening in the housing. In still other embodiments, the robotic device might drive up next to the device and pick up the device using an appropriate mechanism. In some embodiments, the robotic device can slide or otherwise move the device at least partially in a side of the device for purposes of charging or data connection, etc. Various other such approaches can be used as well.

In this example, the robotic device has opposing grippers 606 that are able to move together to grab opposing sides of the electronic device 608 and lift the electronic device in order to transport the electronic device to a different location. It should be understood that the grippers here are merely examples and that other types of translatable, rotatable or moveable mechanisms such as arms, clamps, scoops or other such elements can be used to accept and move an electronic device as well within the scope of the various embodiments.

Using such gripping mechanisms, a robotic device 600 can lift an electronic device 608 and transport that device to a specific area, such as the location of a charging mechanism. Once positioned, the robotic device can lower or set the electronic device on the charger, for example, and can pick the electronic device back up once charged. In other embodiments, there is a capacitive charger (or similar device) inside the robotic device, such that when the robotic device picks up the device 608, the device can be in sufficient proximity of the charger to charge the device. In such an embodiment, the robotic device might not need to transport the device at all, but can charge the device wherever the device was placed and leave the device there when charged. It should be understood, however, that in some embodiments the robotic device might transport the device to an out-of-the-way location, even though the device could be charged at the original location.

Figure 7:
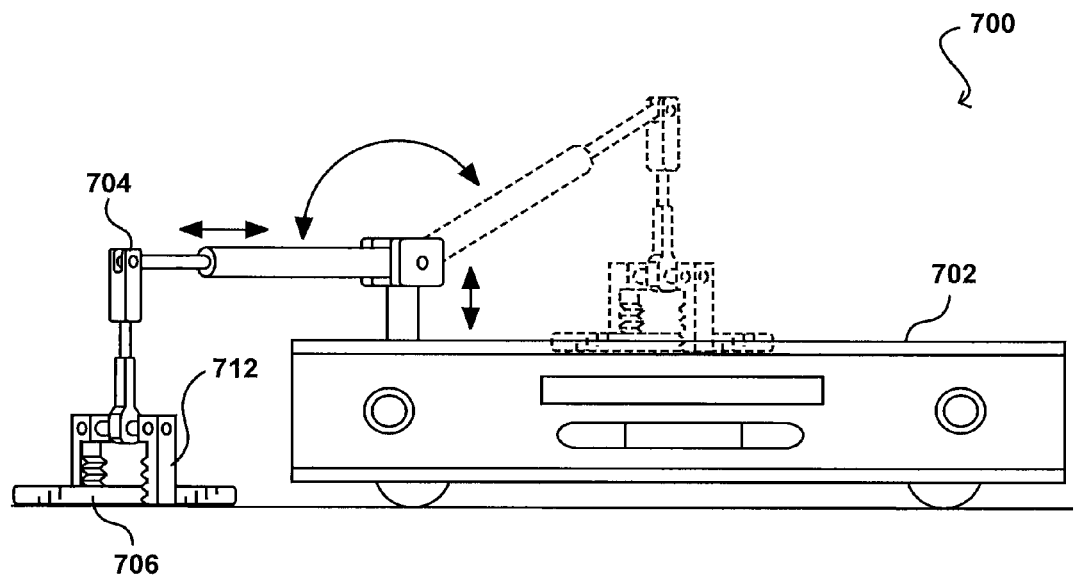
FIG. 7 illustrates a side view of another example apparatus that can be used in accordance with various embodiments.

FIG. 7 illustrates an example robotic device 700 in accordance with another embodiment. In this example, the robotic device includes a controllable mechanical arm assembly 704 that is able to extend, rotate, tilt, expand, contract and/or otherwise articulate in order to at least lift an electronic device for charging, transportation or another such purpose. The arm assembly 704 in this embodiment contains a gripper 712 at one end that is able to grasp a device in such a way as to be able to securely lift the device 706. In some embodiments, the arm lifts the device and the robotic device can then transport the device to an appropriate location, such as to place the device on a separate charging station (not shown). In this embodiment, the arm is able to rotate and perform one or more lateral movements over at least a portion of the assembly in order to lift the device from its initial position and place the device 706 on the upper surface (or another appropriate surface or location) on the housing 702. If the upper surface is part of a charger, the robotic device can lift the device onto the upper surface in order to charge the device, and then using the same arm assembly place the device back in the same location or in a designated or other appropriate location.

A mechanical arm assembly in accordance with various embodiments is capable of accessing an electronic device placed on a surface up to a given height or distance, such as up to three feet in any direction away from the robotic device. For example, a robotic device might be able to access an electronic device placed on a coffee table, but might not be able to access a device set on a tall chest of drawers. As discussed elsewhere herein, the robotic device or electronic device can notify the user if the robotic device is unable to access the electronic device due at least in part to the location of the electronic device. If the electronic device is to be placed on a charger, in a docking station, or at another appropriate location, the arm assembly can lift the electronic device and either hold the electronic device or place the electronic device on the robotic device while transporting the electronic device and then can place the electronic device in the intended location. While a particular mechanical arm assembly is shown for purposes of explanation, it should be understood that there are a number of ways in which an object can be secured, lifted, transported or otherwise moved using a mechanical and/or electronic assembly, and that many of these approaches can be used with the robotic device in accordance with the various embodiments, as should be apparent to one of ordinary skill in the art in light of the teachings and suggestions contained herein. It should also be understood that in at least some embodiments, the mechanical assembly could be at least partially contained within the device itself, such that the electronic device can at least assist in placing itself on, in, or near the robotic device.

In order to properly secure an electronic device without damaging or dropping the device, the robotic device in many embodiments is operable to determine an orientation of the electronic device and position the robotic device or an assembly or other portion thereof in order to account for the current orientation of the electronic device. In some embodiments, the robotic device is able to determine the orientation of the electronic device using at least one camera to capture at least one image of the electronic device and an image analysis algorithm to determine the orientation. In some embodiments, the robotic device can continue capturing images and/or video while approaching the electronic device, in order to properly position the robotic device with respect to the electronic device. In embodiments with arm assemblies or similar mechanisms, the robotic device can also image the assembly while securing and/or moving the electronic device, in order to make any necessary adjustments. The assembly can also include pressure sensors or other such elements to ensure the robotic device does not exert excessive force on the electronic device.

In some embodiments, the electronic device itself is able to communicate orientation, direction and/or positional information to the robotic device in order to help the robotic device determine the appropriate relative orientation to manipulate the device. For example, the electronic device might indicate a location using GPS data and a direction using an electronic compass. Based at least in part upon this information, which can be communicated over a wireless or sideband channel, the robotic device can determine a relative orientation of the electronic device to the robotic device and can determine an appropriate path to take to arrive at a desired orientation with respect to the electronic device. For example, if the robotic device has a scoop that is intended to pick up the device substantially along a certain axis of the electronic device, then the robotic device (or device or remote service) has to determine an appropriate direction from which the robotic device needs to approach the electronic device.

Figure 8:
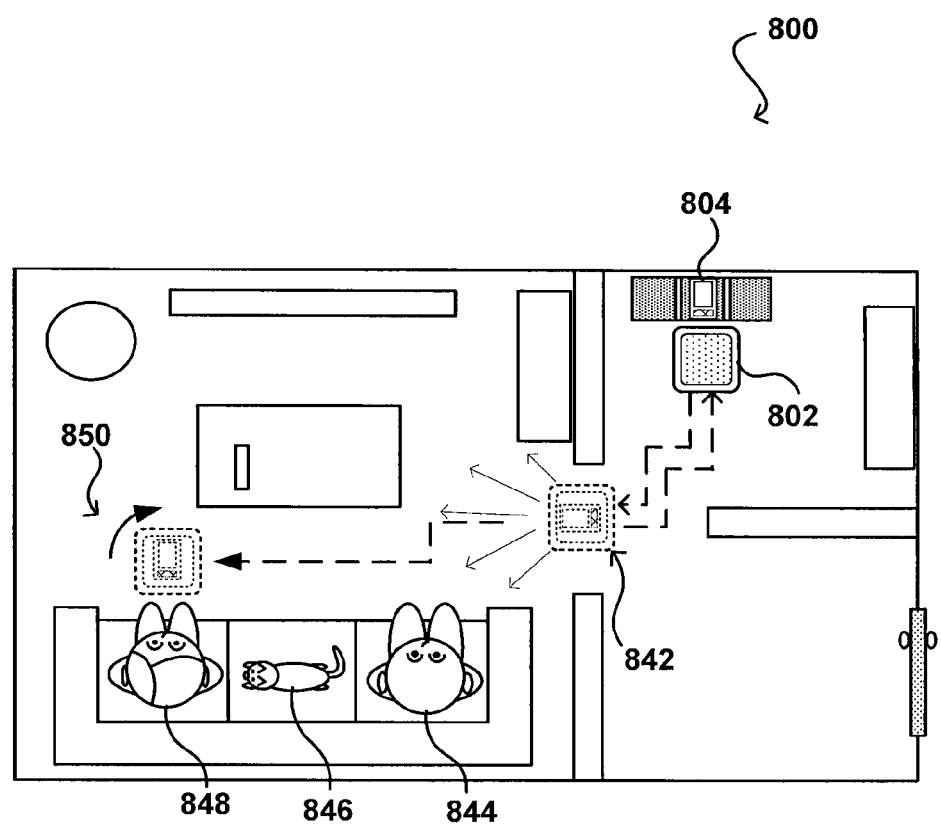
FIG. 8 illustrates an environment and situation in which an apparatus can operate in accordance with various embodiments.

A robotic device that is able to secure and transport an electronic device can be used for any of a number of different tasks. For example, the situation shown in FIG. 8 illustrates an environment 800 in which the robotic device 802 is performing the task of delivering an electronic device 804 to a user 848. In this example, the electronic device 804 is already positioned on the robotic device 802, but in other examples the robotic device could first locate the device using approaches such as those discussed above. The electronic device could have an event occur, such as a message being received, an incoming call, a calendar notification or any other such event of which the user of the device might wish to be notified. In such a situation, the robotic device and/or electronic device can attempt to determine a current location of the user in order to transport the device to the user.

In one example, the robotic device can begin moving along a path that is likely to take the robotic device past the user, based upon mapping or configuration information. For more urgent notifications, however, the robotic device might want to be able to locate the user more quickly. In one example, the robotic device (or device) can emit an audible notification, such as a phone ring, bell, ring tone, signal, computer-generated speech or other such notification that can be heard by a user in that environment. This can be performed using a speaker of the robotic device, for example. In response, a user can call out to the device using a specific command, such as "in the living room" or "come to me," etc. In some instances, the electronic device or robotic device can call out the name of the caller, identity of the message source, etc., and the user can respond whether or not the robotic device should bring the electronic device or take another action. If the location of the user is part of the command, the robotic device can move to that approximate location. If the location is not part of the command, the robotic device can attempt to locate the position of the user by triangulating the position of the user using time-of-flight or similar sound-based determinations (as may be determined using multiple microphones on different areas of the robotic device). The robotic device can then automatically move to the likely position near the user. In either case, the robotic device can continue until a user is viewable by an imaging element of the robotic device, or determinable using another such component.

In FIG. 8 the robotic device could figure out based on the user command that the user is in the living room. The robotic device can then determine a path and move to a position 842 in or near the living room. From this position, the robotic device can use at least one imaging element or other such component to attempt to locate the user. Here, the robotic device can pick up the intended user 848, another person 844 and the family pet 846. Using image analysis, facial recognition, voice recognition, heat signatures or any other appropriate identification approach known or subsequently developed for such purposes, the robotic device 802 can identify the user and, based at least in part upon the mapping information, move to a position 850 from which the user will be able to access the device. In some embodiments, the robotic device can even rotate at that position in order to make it easier for the user to grab the device, read a message on the device, etc.

In addition to delivering an electronic device to a user, the robotic device may be capable of performing any number of other tasks. For example, if a user has placed an electronic device near a doorway, such as the entry door to a house, the robotic device is able to obtain the electronic device from its position and move that electronic device to a specific location. In this example, the robotic device detects the presence of the electronic device, such as by receiving a signal from the electronic device, passing by that location on a specific path at a specific time, by randomly viewing the electronic device while the robotic device is moving through the environment or using any other such approach. If the robotic device has been configured to perform the task of taking the electronic device to a docking/charging station, for example, the robotic device can determine an appropriate path to take from a current position of the robotic device to the charging station based at least in part upon the mapping information stored in the robotic device (or otherwise accessible). In one embodiment, the robotic device determines a current location using GPS data or other information discussed herein and compares the current location and the destination location with the mapping information. The robotic device can determine a path by considering any walls or other obstructions between the current location and the destination, as well as a minimum distance from obstructions needed for the robotic device to pass and then can generate a path that can be the shortest, fastest or easiest path, or that meets another such criterion. In some embodiments, the robotic device can use the same path in reverse to obtain the electronic device from the charging station when the device is charged, or another retrieval criterion is met, and can move/drop the device to its original location near the doorway, such that the user of the electronic device can pick up the charged electronic device when leaving the environment.

In some embodiments, the electronic device can notify the robotic device of its location and/or the need for the device to be charged. For example, in one embodiment the device and robotic device can communicate via a wireless connection such as Bluetooth, such that when the device and robotic device detect each other as being within range, the robotic device can move to the door, the device can send position updates based on GPS or accelerometer data, or any other appropriate communication can occur. In other embodiments, the robotic device and/or electronic device might include a mapping feature that learns locations over time that can be used to enable the robotic device to locate the device. For example, instead of sending coordinates that might be imprecise indoors, the electronic device might instruct the robotic device that the device is "on the kitchen table" or "near the refrigerator," whereby the robotic device can move near that location and then locate the device using image or other such information. The identities of these locations can be determined using any appropriate approach, such as image analysis, user input, behavior monitoring, etc.

In some embodiments, the robotic device might not come get the electronic device unless the device sends a communication to the robotic device that the electronic device needs to be charged, whereby the robotic device can determine the location of the device and move toward that location. In some embodiments, the robotic device will need to determine the type of charging to be used for a particular device. For example, the robotic device might work with a first device that is charged through a docking station and a second device that can be charged capacitively. The robotic device can determine whether the device can be charged by the robotic device or requires another component and then can determine whether the charging via the robotic device or component can be done capacitively or by a direct power connection. The robotic device can also determine whether other tasks are to be performed, such as to enable a high-bandwidth transfer or resource-intensive operation and can cause the electronic device to be connected to the appropriate component(s) as discussed elsewhere herein. Various other types of notifications and communications can be used as well as discussed elsewhere herein.

Communications between the electronic device and robotic device can occur at other times as well, for similar or other purposes. For example, the electronic device might be positioned on a docking station, or in another appropriate location. If the electronic device is finished charging, or if the electronic device is otherwise to be moved for a reason such as those discussed elsewhere herein, the electronic device can send a signal to the robotic device to come and pick up the electronic device from its current location. As should be understood, the electronic device can include position information with the request, which can be GPS or other position data, or can be mapping or location data, such as may indicate to the robotic device that the device is in its proper location on the charger, as opposed to providing coordinate and direction information. The robotic device in this example can then determine a path to the charger, or use a previously-determined path from the current location to the charger, and upon obtaining the device, can transport the device to any appropriate location.

The robotic device 802 in FIG. 8 can initially be at a rest location and/or at a location where the robotic device itself can be charged. In some embodiments, the robotic device can go to a location where the device can plug in or be capacitively charged. In other embodiments, the robotic device might move to a location where the sun is shining, in order to charge the device at least partially via solar power. In some embodiments, the robotic device can learn the location of one or more sunspots throughout the day and can move to those locations when not performing other tasks, in order to maximize the use of solar energy.

Figure 9:
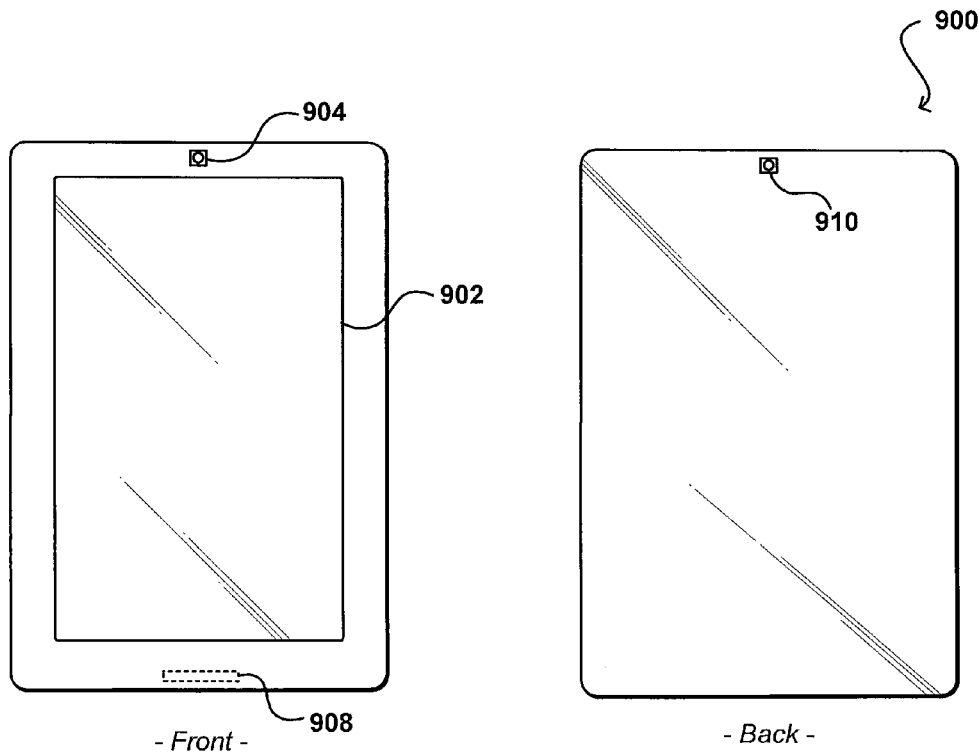
FIG. 9 illustrates front and back views of an example electronic device that can be used in accordance with various embodiments.

As discussed, a robotic device in accordance with various embodiments can communicate with an electronic device that is to be charged, transported or otherwise manipulated by at least some aspect of the robotic device. FIG. 9 illustrates front and back views, respectively, of an example electronic device 900 that can interact with a robotic device for any of these or other such purposes in accordance with various embodiments. Although a portable computing device (e.g., an electronic book reader or tablet computer) is shown, it should be understood that any electronic device capable of receiving and processing input, or at least capable of being transported and/or charged, can be used in accordance with various embodiments discussed herein, where the devices can include, for example, desktop computers, notebook computers, personal data assistants, smart phones, video gaming consoles, television set top boxes and portable media players. In this example, the electronic device 900 has a display screen 902 on the front side, which under normal operation will display information to a user facing the display screen (e.g., on the same side of the computing device as the display screen). The computing device in this example includes a front image capture element 904 and a back image capture element 910 positioned on the device such that, with sufficient wide angle lenses or other such optics, the computing device 900 is able to capture image information in substantially any direction about the computing device. In some embodiments, the computing device might only contain one imaging element, and in other embodiments, the computing device might contain several imaging elements. Each image capture element may be, for example, a camera, a charge-coupled device (CCD), a motion detection sensor or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. In certain embodiments, the imaging elements of the electronic device can be accessible to the processor of the robotic device, and the cameras or sensors of the robotic device can be accessible to the electronic device. Similarly, other components can be utilized or shared between the robotic device and various devices as discussed and suggested elsewhere herein.

The example electronic device 900 also includes a microphone 908 or other audio capture device capable of capturing audio data, such as words spoken by a user of the device. In this example, a microphone 908 is placed on the same side of the device as the display screen 902, such that the microphone will typically be better able to capture words spoken by a user of the device when the device is being used. In at least some embodiments, the microphone can be a directional microphone that captures sound information from substantially directly in front of the device and picks up only a limited amount of sound from other directions, which can help to better capture words spoken by a primary user of the device.

The example electronic device 900 also includes at least one position and/or orientation determining element (not shown). Such an element can include, for example, an accelerometer or gyroscope operable to detect an orientation and/or change in orientation of the computing device 900. An orientation determining element can also include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device. Various embodiments can include one or more such elements in any appropriate combination. As should be understood, the algorithms or mechanisms used for determining relative position and/or orientation can depend at least in part upon the selection of elements available to the device.

Figure 10:
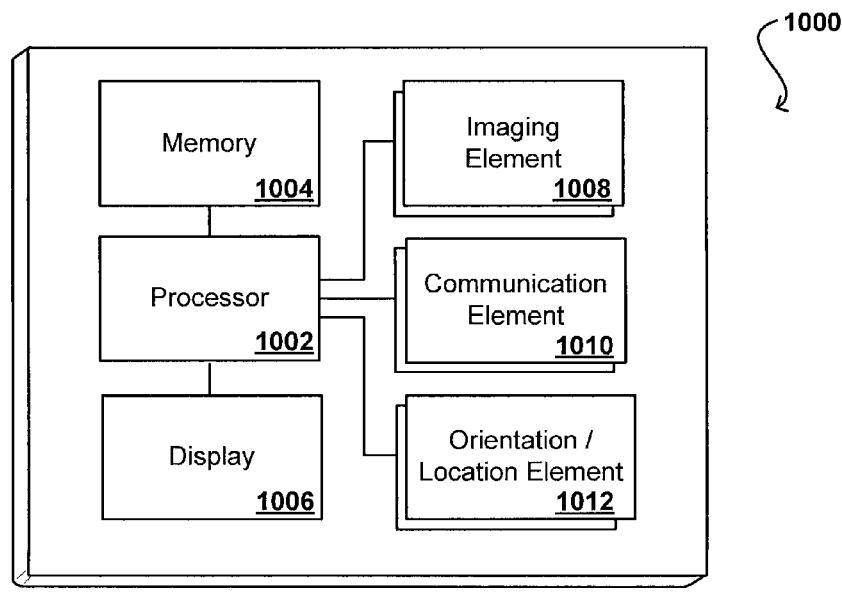
FIG. 10 illustrates an example configuration of components of an apparatus that can be used in accordance with various embodiments.

FIG. 10 illustrates a logical arrangement of a set of general components of an example computing device 1000 such as the device 900 described with respect to FIG. 9. In this example, the device includes a processor 1002 for executing instructions that can be stored in a memory device or element 1004. As would be apparent to one of ordinary skill in the art, the device can include many types of memory, data storage or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one image capture element 1008 such as a camera or infrared sensor that is able to detect objects in the vicinity of the device. In some embodiments, the device will include at least one camera on each surface or side and can include one or more fisheye or wide-angle lenses. It should be understood that image capture can be performed using a single image, multiple images, periodic imaging, continuous image capturing, image streaming, etc. Further, a device can include the ability to start and/or stop image capture, such as when receiving a command from a user, application or other device. The device also can include one or more orientation and/or location determining elements 1012, such as an accelerometer, gyroscope, electronic compass or GPS device. These elements can be in communication with the processor in order to provide the processor with positioning and/or orientation data.

In some embodiments, the electronic device 1000 of FIG. 10 can include one or more sideband communication elements 1010, such as a Wi-Fi, Bluetooth, RF or other wireless communication system. In some embodiments, the device can include at least one additional input device able to receive conventional input from a user. This conventional input can include, for example, a push button, touch pad, touch screen, wheel, joystick, keyboard, mouse, keypad or any other such device or element whereby a user can input a command to the device. In some embodiments, however, such a device might not include any buttons at all, and might be controlled only through a combination of visual and audio commands, such that a user can control the device without having to be in contact with the device.

Figure 11A:
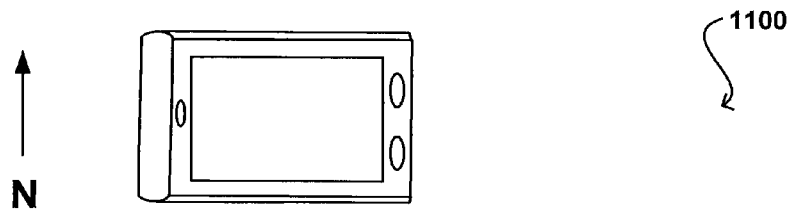
FIGS. 11(a)-(e) illustrate changes in orientation and/or position of an electronic device that can be used in accordance with various embodiments.
Figure 11B:
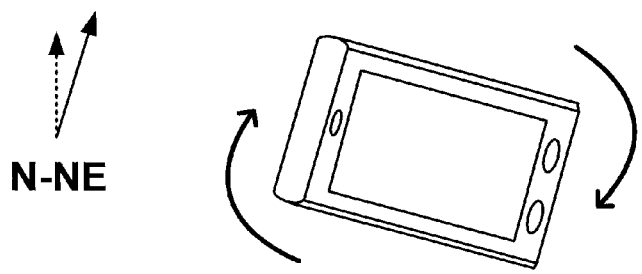
Figures 11C, 11D:
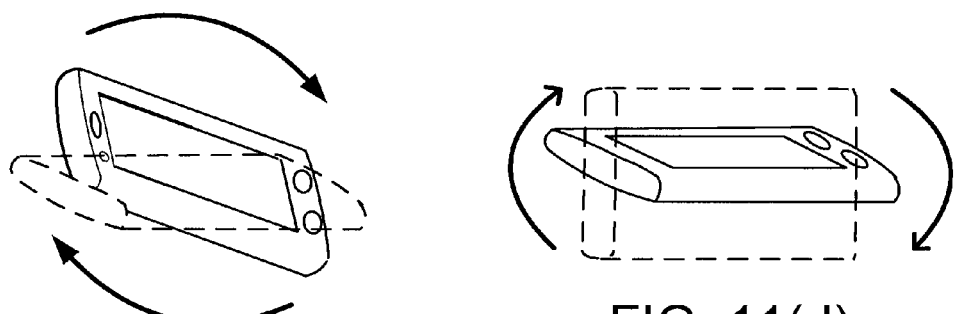
Figure 11E:
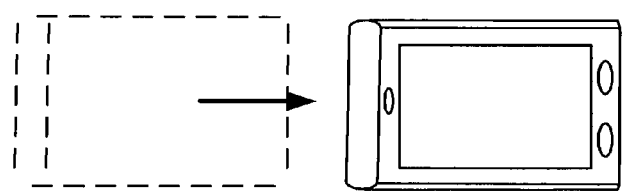

FIGS. 11(a)-11(e) illustrate example types of information that can be obtained using location and/or orientation determining elements of an example device 1100 in accordance with various embodiments. As discussed, such information can help a robotic device to locate the device, as well as to ensure that the robotic device approaches the device from an appropriate angle or direction when the robotic device grabs, scoops, picks up or otherwise connects with the device for purposes of at least transporting or adjusting a position of the device. For example, FIG. 11(a) illustrates that the device is facing substantially north (according to a selected or defined axis of the device), while FIG. 11(b) illustrates that the device has been adjusted in direction such that the device is now facing in a north-northeast direction. The change in direction, as well as the number of degrees or other measurement of the change, can be determined using an element such as an electronic compass. FIGS. 11(c) and 11(d) illustrate changes in orientation (e.g., tilted to the side and back, respectively) that do not change the direction and thus might not be detected as a direction change by a compass. Such changes in orientation can be picked up by an orientation determining element such as an accelerometer or gyroscope. FIG. 11(e) illustrates a change in the position of the device. While such motion can be picked up by an element such as an accelerometer, an element such as a GPS device can give more accurate and/or precise location information for a current position of the device in at least some situations. Various other types of elements can be used as well to obtain any of these and other changes in orientation and/or location. As discussed above, these and/or other such determinations can be combined with the projected image information to determine aspects such as the identity and relative position of various devices.

In embodiments where the robotic device and an electronic device are able to communicate, such as over a wireless sideband channel, the robotic device can determine a location of the device at any appropriate time and move to that position (if possible). For example, the electronic device might be able to tell from GPS information or other data that the device is on the floor at a particular location. In some embodiments, the device can communicate to the robotic device that the device requires charging. Upon receiving such information, the robotic device can utilize its current location and orientation information with the orientation and/or position information of the device, along with the stored mapping information, to locate the device. In other embodiments, the robotic device might be able to detect a presence of an electronic device, or vice versa, such as by detecting that the device is within a given range based on the strength of a wireless or Bluetooth signal, and in response can move to a predetermined location. For example, if the robotic device just begins to pick up a Bluetooth signal from the electronic device, the robotic device can assume that the electronic device is coming home, for example, and can move to a predetermined or specified location, such as a location by the front door of the home. If the robotic device and device are both connected to a network such as the Internet, the robotic device can track the position of the electronic device over time and can move to the location of the electronic device in response to information from the electronic device, such as a notification or signal requiring the robotic device to contact the electronic device.

The ability for the robotic device to determine the location of the electronic device can also have other benefits as well. For example, if the user cannot remember where the user left the electronic device, the user can issue a voice command (or other appropriate command) such as "robotic device—bring me my PDA," and the robotic device can retrieve the electronic device from its current location. If the robotic device cannot obtain the electronic device, such as where the electronic device is placed on a shelf that cannot be reached by the robotic device, the robotic device can position itself near the electronic device and issue a notification such as "device located" by using computer-generated speech emitted by at least one speaker of the robotic device (or the device).

Figure 12:
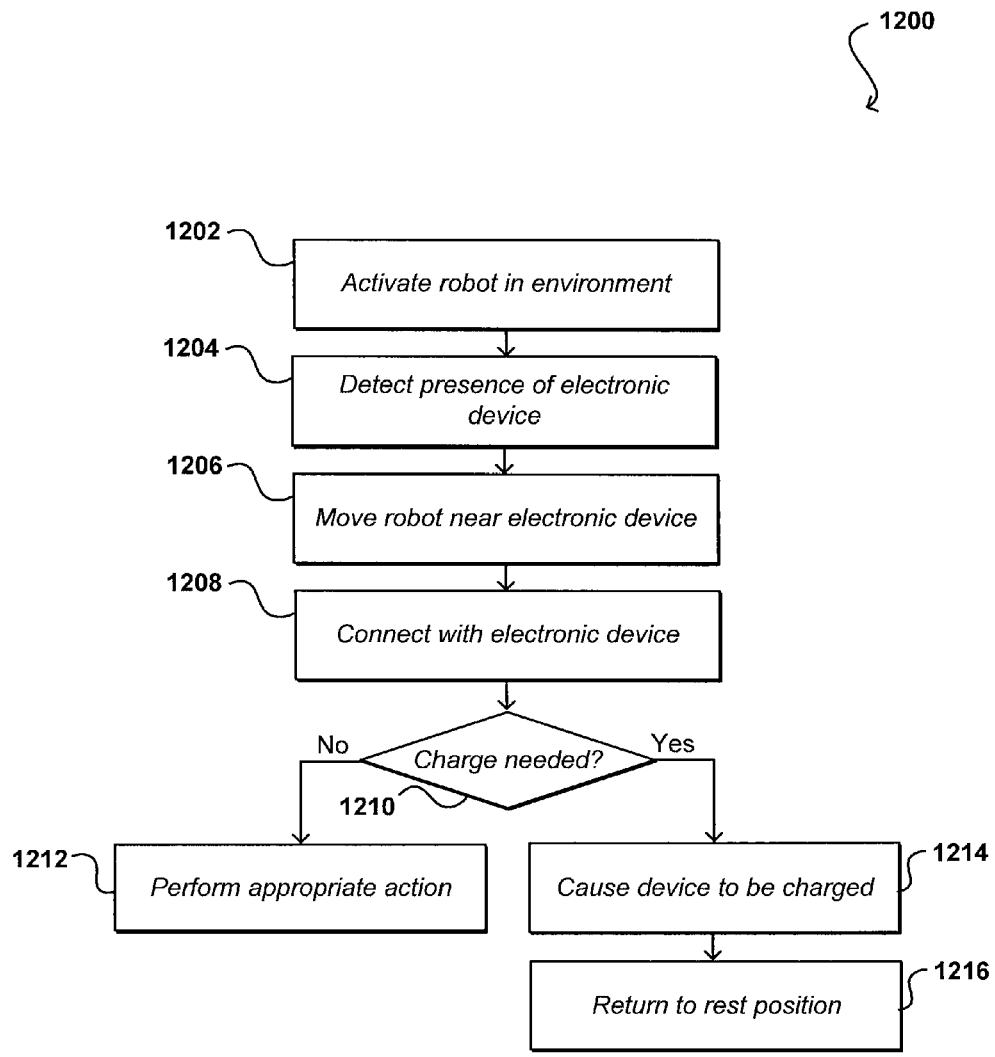
FIG. 12 illustrates an example process for charging a device that can be used in accordance with various embodiments.

FIG. 12 illustrates an example process 1200 for charging an electronic device that can be utilized in accordance with at least one embodiment. In this example, a robotic device as discussed herein is activated and positioned in an appropriate environment 1202. In some instances, the robotic device can also undergo a mapping process in order to determine the boundaries of the environment that can be traversed by the robotic device. During operation, the robotic device can detect the presence of an electronic device capable of being charged by the robotic device 1204. As discussed elsewhere herein, the robotic device can be configured to detect and/or communicate with specific devices or can detect a compatible device using any appropriate signal detection or communication mechanism. In other embodiments, the robotic device might instead move periodically, randomly or continually throughout the environment, and might detect the device using image recognition or another such process. In cases where the robotic device can communicate with the electronic device, the robotic device might also receive charge information in addition to position or presence information, which can determine in at least some embodiments whether the robotic device physically interacts with the device. In other embodiments, the charge information for the device might determine whether the robotic device causes the device to be charged, or instead transports the device to a specific location.

Upon detecting the presence of the device, and making any other appropriate determination, the robotic device can automatically move to a position near the device 1206. Movement of the robotic device 1206 occurs without human input. In embodiments where the robotic device has a mapping stored and receives position information from the device, the robotic device can calculate the shortest or most appropriate route, for example, and can follow that route or path to the device. In some embodiments, the robotic device can be configured with specific locations where the device can be accessed and can move to each of those locations until the electronic device is located. In other embodiments, the robotic device might continue moving about the environment until the electronic device is located through imaging or other such approaches. As discussed, the robotic device in some embodiments might also approach the electronic device from an appropriate direction or orientation. When the robotic device is sufficiently near the electronic device and/or in the appropriate orientation, the robotic device can establish a connection with the electronic device 1208. As discussed elsewhere herein, this can include a person placing the device on the robotic device, the robotic device grabbing or scooping up the device, the robotic device lifting the device through suction or magnetics, the robotic device connecting a charging assembly with the electronic device or any other appropriate process. A determination is made as to whether the device should be charged 1210, such as by the robotic device communicating with the device. If the device does not need charging, or the robotic device is unable to charge the device itself, an appropriate action can be taken 1212, such as to disconnect from the device or to transport the device to a determined location, such as a charging, rest, home or at least out-of-the-way location. Additionally, if it is determined that the electronic device does not need to be charged, it may be determined (either by the electronic device, robotic device or other means) when the electronic device should be charged.

If the electronic device needs to be charged, the robotic device can cause the electronic device to be charged 1214, either by charging the device via the robotic device itself or by positioning the device in a charging station, plugging the device into a power source or using any other approach disclosed or suggested herein. At an appropriate time, such as after charging is completed, upon a command from a user or at a scheduled time, the robotic device can disconnect from the device, transport the device to a designated location or perform another such action. In some embodiments, the robotic device transports the electronic device to any appropriate location, such as the location where the robotic device obtained the device, a designated location or an approximate location of a user. In some embodiments, the robotic device sits at that location until the device is taken from the robotic device or a command is issued, while in other embodiments the robotic device places the device at the location and then is free to move on to other tasks or return to a rest location. Various other combinations and alternatives can be used as well as discussed and suggested elsewhere herein. When the robotic device is done charging the electronic device in at least some embodiments, the robotic device can return to its designated rest position 1216.

An advantage to also having a specified "rest" or charging location for an electronic device is that a user can generally be aware of the position of the device, in case the user wants to access the device. Since the robotic device can obtain the device from any appropriate location, the user does not need to remember where the user left the device, as long as the device was left in a location that is accessible by the robotic device and that enables the robotic device to obtain the device. Further, if the robotic device can obtain input from the user via voice or other commands, the robotic device can bring the device to the user in at least some embodiments, as long as the user is in a region of the environment that the robotic device can access. In other cases, such as where the user is upstairs and the robotic device is downstairs, the robotic device can be configured to bring the device to the bottom of the stairway, or to any other appropriate location that is as close or convenient for the user as possible. In some embodiments, the robotic device can always leave the device in the same location, such as by the front door, so the user will know the location of the device and will also be less likely to forget to take the device when leaving. In some embodiments, the robotic device can be programmed or instructed to take the device to different locations according to a user schedule, such as to take the device to a door by the garage on weekdays when the user has to drive to work and by the front door on weekends when the user tends to walk out the front door. In some embodiments, the device can have access to the user's calendar and can leave the device in appropriate locations at specific times. For example, if the robotic device determines that the user has to go to work early, the robotic device can bring the device to the garage door at an appropriate time before the user will need to drive to work, even if the device is not fully charged or otherwise would not yet be taken to that location. Further, if the user's schedule changes, or the user is detected in a different location, the robotic device can move the device accordingly. In some embodiments, the robotic device does not actually have access to the calendar but can communicate with the device (or another computing device or service) that has access to that information and can send updates or commands to the robotic device.

Other approaches can be used as well within the scope of other embodiments. For example, a robotic device can follow a user between rooms when a user moves. In some embodiments, the robotic device will only attempt to follow the user after the user has been gone for a period of time, such as to avoid following the user when the user goes to briefly get something from the kitchen or answer the phone. Further, the robotic device might not follow the user into certain rooms or areas, such as a bathroom or bedroom closet. If the user is gone from a room for at least a minute, for example, the robotic device can move in the direction where the user was viewed to leave the current room and then can move about the environment in an attempt to locate the user. In other embodiments, the robotic device might periodically follow a path throughout the environment to attempt to determine current locations of various users, devices, etc. In other embodiments, the robotic device might move to rooms that are most often occupied by persons at particular times, such as the entertainment room during the evening or the bedroom at night.

A robotic device in accordance with various embodiments can also use a combination of elements in an attempt to predict the location of a user. For example, the robotic device can have access to a user's calendar or schedule, and can also monitor the movement of a user. For example, if a user goes out the garage door to go to a particular type of event, the robotic device can in the future predict that the user will go out that door to that type of event and can predict that the user will likely come back in that door at some time after the event. The robotic device thus can store (or send information over a network to a system or service that can store) behavioral information about the user. For example, the user might not take an electronic device to certain types of event or at certain times of day (such as in the evening when the user walks the dog). The robotic device can also determine, through image analysis, that the user is going out the front door with the dog and thus likely will not take a device such as an electronic book reader. In some embodiments, the robotic device can even analyze the type of clothing the user is wearing to attempt to predict behavior. For example, if the user is wearing a tie or a dress, the robotic device might predict that the user might want to take a specific type of device, such as a portable phone. If a user is wearing workout clothes, on the other hand, the user might want to take a portable audio player or heart rate monitor. As discussed later herein, the robotic device can then attempt to predict which device the user will want and bring that device to a particular location. Similar actions can be taken by the electronic devices as well. If the robotic device has sufficient capacity, the robotic device can bring multiple devices, such as a smart phone and e-book reader, either at the same time or can position those devices at a desired location through multiple trips. Also as will be discussed later herein, if the robotic device detects that multiple users are preparing to leave together, such as may be based upon their actions, schedules, attire, prior behavior or other such information, the robotic device can bring devices as appropriate for each of those users.

The robotic device can also learn over time and adapt to changes in behavior. For example, in one embodiment the robotic device records information and uploads that information to a central service over a network. That service can monitor changes in schedule or behavior and can feed instructions back to the robotic device. If a user switches jobs, for example, the user might leave for work at a different time and the change in behavior can be adjusted appropriately. The changes can occur over time using an average, curve fitting or similar analytical approach such that leaving early or late one day may not affect the behavioral determinations, but a change that occurs over a few days may cause the predicted behavior to change a little each day or change entirely after a few days of altered behavior. Any of a number of predictive or behavioral monitoring algorithms known or subsequently developed for such purposes can be used within the scope of the various embodiments.

In some embodiments, the robotic device can be in periodic or continual communication with an electronic device or can receive updates as appropriate from the device. For example, if a GPS on the device detects a significant amount of movement of the user, such as when the user is driving in a car or walking at least a threshold distance, the device can send information to the robotic device (or a service working with the robotic device) that enables the robotic device to predict any changes in user behavior or location and make adjustments accordingly. For example, if the robotic device detects that the user is likely driving home early based on the current route, the robotic device can take an appropriate action, such as to move near the garage door. If the robotic device determines that the user is at a restaurant across town when the user is normally on his or her way home, the robotic device might also adjust the predicted behavior and not perform any actions until the user is detected to be heading home. It should be understood that these determinations could alternatively be made by the device itself, which then can send commands to the robotic device over a network, etc. For example, the device could use a GPS and behavior information to determine when a user is likely to get home and can call to the robotic device when the user is a given time away from the house. The electronic device can also give updates to the robotic device, such as if the user is detected (using the GPS, accelerometer, etc.) to move to an unexpected location, such as the front or back door instead of the garage door, such that the robotic device can move accordingly. As will be discussed later herein, the device can also communicate other information, such as whether the device needs to be charged, such that the robotic device can adjust its behavior accordingly. In some embodiments, the robotic device will not move to get the device if the device does not require charging or take another such action.

In some embodiments, the electronic device will not have an accurate location determination mechanism, could lose power or might be otherwise unable to transmit certain information. Accordingly, a number of various other options can be used to attempt to determine user location or proximity. For example, certain automobiles utilize key fobs or other elements that enable the keys to be detected over a distance, such that an automobile can perform certain actions when the keys are nearby (e.g., unlock the doors). In some embodiments, the robotic device can be configured to detect such a key (or other such tag or identifier), enabling the robotic device to determine when the user has arrived at home (when the user has the key). The robotic device can then also potentially determine which door the user is entering, when the user is getting ready to leave and other such information. An additional advantage of such an approach is that the robotic device can assist when a user does not remember where the user left the key. For example, the user could issue a command such as, "robotic device—find my keys" and the robotic device could move to a location near the key (per the detection mechanism) and emit a sound or other notification, such as a beep or a computer-generated voice notification such as "keys found" or even "keys on the kitchen counter" if such information is available. In certain embodiments, and depending upon the accessibility of the keys, the robotic device can even grab the keys and bring them to the user. In certain embodiments, the robotic device can treat the keys as an electronic device as discussed herein and can pick up the keys when the user drops them on the floor and take them to a particular location and then can bring the keys to the user on command, per predicted behavior, etc. In some embodiments where the automobile uses a key with remote starting capability, the user can call to the robotic device to "start the car" and the robotic device can move within sufficient distance of the automobile with the key and can activate the remote ignition. In certain embodiments where the garage door opener is connected to the robotic device via wireless communication, over the Internet, etc., the robotic device can also open the garage door in order to prevent the buildup of exhaust from the automobile. Various other such actions can be performed as well as should be apparent in light of the present disclosure.

In some embodiments, a robotic device can also have a "guest" mode or similar capability, which could be user-configurable, that enables the robotic device to perform similar functions for devices that might not otherwise be known to the robotic device. For example, the robotic device can be configured to transport any electronic device left in a predetermined location to a specified location. In some embodiments, such as where the robotic device is able to communicate with the guest device over a sideband or wireless channel, the robotic device can determine whether the guest device can be charged using an available charging mechanism and, if so can cause the guest device to be charged as discussed elsewhere herein. In some embodiments the robotic device can learn an identity of the guest device, using image, voice or other such recognition, and can bring the guest device to the guest or perform other functions discussed elsewhere herein. The robotic device can also develop and/or adjust a user recognition model over time, such that if a guest repeatedly utilizes the robotic device with a device, the robotic device can attempt to refine a recognition model such that the user can recognize voice commands, recognize the guest in different outfits, etc.

A robotic device that is able to distinguish between different users, and associate those users with specific devices, can perform additional functionality in accordance with various embodiments. For example, three users each might have the robotic device charge at least one device. If one device has an event occur that requires the robotic device to take that device to the respective user, the robotic device can identify the user through the association with the device and can locate the appropriate user based at least upon the user recognition model or other such information. Further, if one of the users calls for the robotic device to bring a device, the robotic device can recognize the identity associated with the voice, determine the appropriate device and take the device to the appropriate user. Different users can also configure the robotic device to determine different tasks or exhibit different behavior, which can be used to guide the robotic device. Various other user-specific functionality can be provided in accordance with other embodiments and functions discussed elsewhere herein.

While a robotic device in many embodiments can recognize multiple devices, associate those devices with various users and determine when those devices need charging, some of these approaches can either end up charging a device each time it is contacted by the robotic device or only charging the device when the device has a low stored charge. The former case can reduce the life of the battery in the device, as discussed above, because frequent charging of a device when charging is not needed can result in trickle charging, which is known to reduce battery life. Further, waiting until the device is running low on power can result in a device losing power, as the device might not have been charged at the beginning of a day that requires heavy usage by a user.

Accordingly, robotic devices in accordance with various embodiments can monitor device usage patterns, as well as device states, levels and other such values, to attempt to determine and/or predict when a device should be charged. While various determinations will be discussed with respect to the robotic device and device working in tandem, it should be understood that the determinations could be made by the device alone, the robotic device alone, a third component or a system or service in communication with at least the robotic device or device. In some cases, a charger can also be used as part of the charging determination process. For example, a robotic device could place a device in a docking station with a built-in charging mechanism whether or not the device needs charging. The docking station can communicate with the device and/or robotic device to determine when or whether the device should be charged and can charge accordingly.

A variety of approaches and/or processes can be used within the scope of the various embodiments to determine when to optimally charge a device. For example, a robotic device might look at the behavioral data, historical data, schedule or other such information to determine how much power the user is likely to use before the next opportunity to charge. Another algorithm might look at these and/or other types of data to attempt to determine a likelihood that the device will run out of power before the next opportunity to charge. Other approaches might use various thresholds, percentages, set values or any other appropriate mechanism to attempt to determine when to charge a device. In some cases, the robotic device and/or charger could communicate with the device to determine whether to charge the device. In other cases, the robotic device or charger could instead request information from the device and make the determination. In other cases, the device can contact the robotic device and/or charger when the device determines it should be charged. If the device is not in a location where the robotic device can access the device, the device can provide a notification to the user that the device should be charged, such as by emitting a beep or specific tone or using generated speech to say to the user "please recharge the device" or something similar. In alternative embodiments, the robotic device could move to a location near the user and display or emit a similar notification. Texts, pages, messages or other such notifications can be used as well, as may be configurable by the user.

In situations where there are multiple devices, there can be different charging windows or other types of approaches used for each device. For example, certain devices might be used every day or might have significantly higher rates of usage. Other devices might be used by different users, who have significantly different usage patterns. Still other devices might only be brought for charging periodically, instead of substantially every day. An electronic device or robotic device can also have different approaches available and can analyze the results over time in order to select an approach that provides the best results for each specific user or device.

If a robotic device or electronic device has access to information such as a GPS and a calendar for a user, for example, various determinations can be made as well. For example, if the user is scheduled to be in his or her office for the next four hours, then drive to a remote location that will bring the device near the end of its charge, a determination can be made that the electronic device should be charged. The robotic device or electronic device can then generate (or otherwise cause) an appropriate notification for the user. If, on the other hand, the user would be driving straight home and/or will not be in the office long enough to get a full charge on the device, a determination might be made to wait until the user gets home to recommend charging the device. If available, the device could recommend that the user charge the device while in the car on the way to the remote location. Various other options exist as well as should be apparent.

In at least some embodiments, however, it can be desirable to minimize the annoyance or distraction of the user by the electronic device or robotic device. For example, if the robotic device is able to determine that the user likely cannot currently charge the device based on the location of the device or current task, then there may be little benefit to indicating to the user that the user should charge the device. In such an instance, it may be preferable to wait until the user can actually charge the device. In other cases, the device might notify the user once while the user is away from a charging location and not bother the user again until the user is able to charge the device. Even when at the charging location, a robotic device or device might only notify the user a limited number of times that the device needs to be charged, in order to minimize annoyance or distraction that might otherwise be caused by repeated notifications. In some embodiments, a device, robotic device and/or charger can work together to only charge the device when needed, and automatically charge the device when the user leaves the device in an appropriate location, such that the user very rarely has to deal with charging the device or receiving notifications. In such embodiments, the user might only be notified when the device is away from home longer than predicted, usage is higher or another situation occurs where the device is not able to be charged as anticipated.

Figure 13:
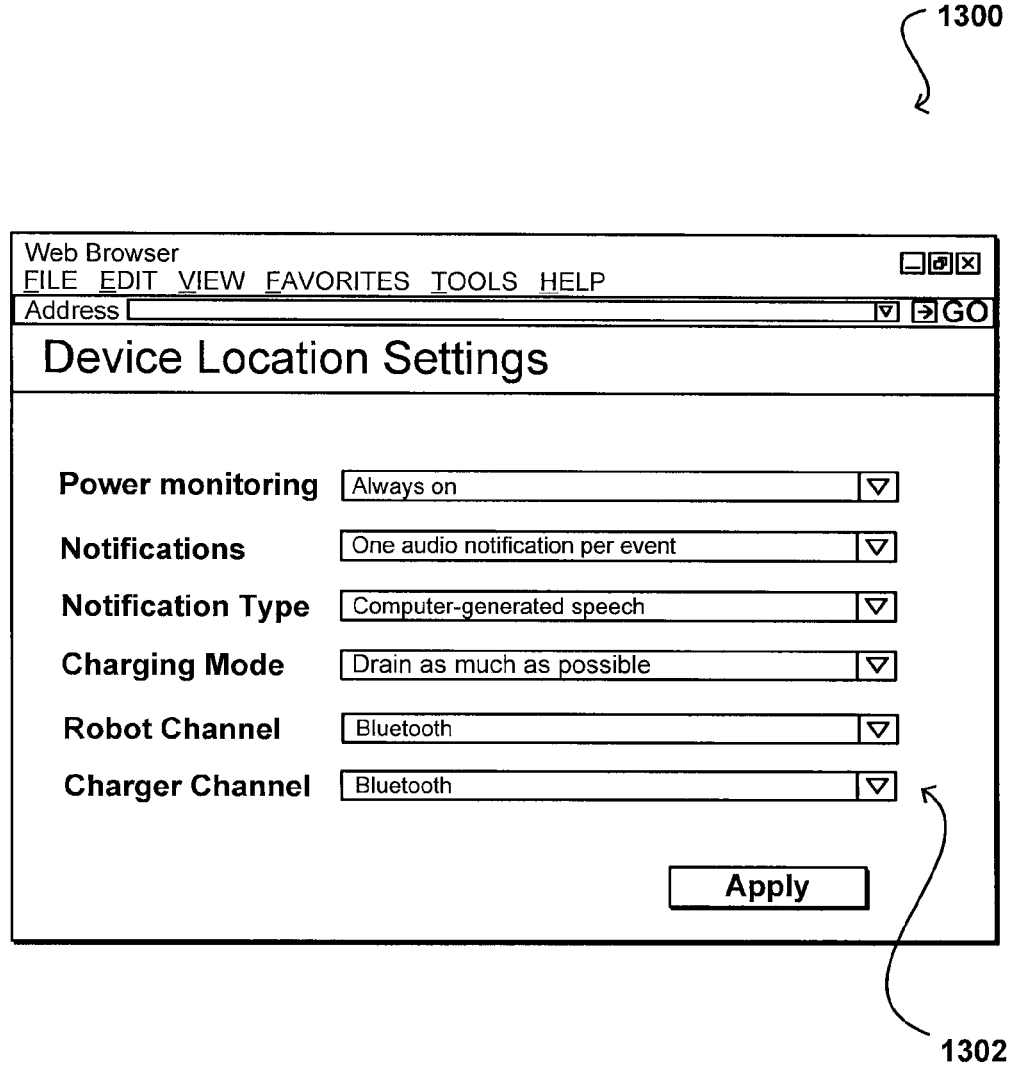
FIG. 13 illustrates an example configuration interface that can be used in accordance with various embodiments.

As discussed, a user can have the ability to configure various aspects of the operation of a device, robotic device, charger, etc., within the scope of the various embodiments. FIG. 13 illustrates an example interface 1300 that can enable a user to perform such configuration through a variety of configurable options 1302. While a set is shown for purposes of explanation, it should be understood that there can be any of a number of options and combinations as discussed elsewhere herein. Further, while in this example the options are presented as drop-down boxes, it should be understood that any other appropriate elements such as radio buttons, checkboxes, text boxes or other such interface elements can be used as well within the scope of the various embodiments. In the example options displayed, a user is able to specify when the power monitoring and adjustment analysis is to be performed, such as always on or only when the power reaches a certain level, in order to conserve resources. A user can also specify a frequency of notification, as well as a type of notification. The user can specify a charging mode or approach, such as a mode that charges as often as needed to prevent a loss of power or a mode that drains the charge as much as possible to conserve battery life. The device can also configure communication bands or channels to use to connect to other devices, such as a robotic device or charger, as may depend upon factors such as whether the user has a wireless network available or whether the user receives a strong cellular signal at that location. Any of a number of other options and values can be used as well within the scope of the various embodiments.

In some embodiments where a robotic device provides capacitive charging, a robotic device can monitor an energy pattern of a device or object at least partially on, in or near the device in order to determine whether to provide a capacitive charge. Certain inappropriate objects (e.g., car keys) can potentially damage the robotic device if a capacitive charge is applied, such that energy pattern monitoring can be beneficial to cause the robotic device to begin and/or stop charging as appropriate to prevent such damage.

Figure 14:
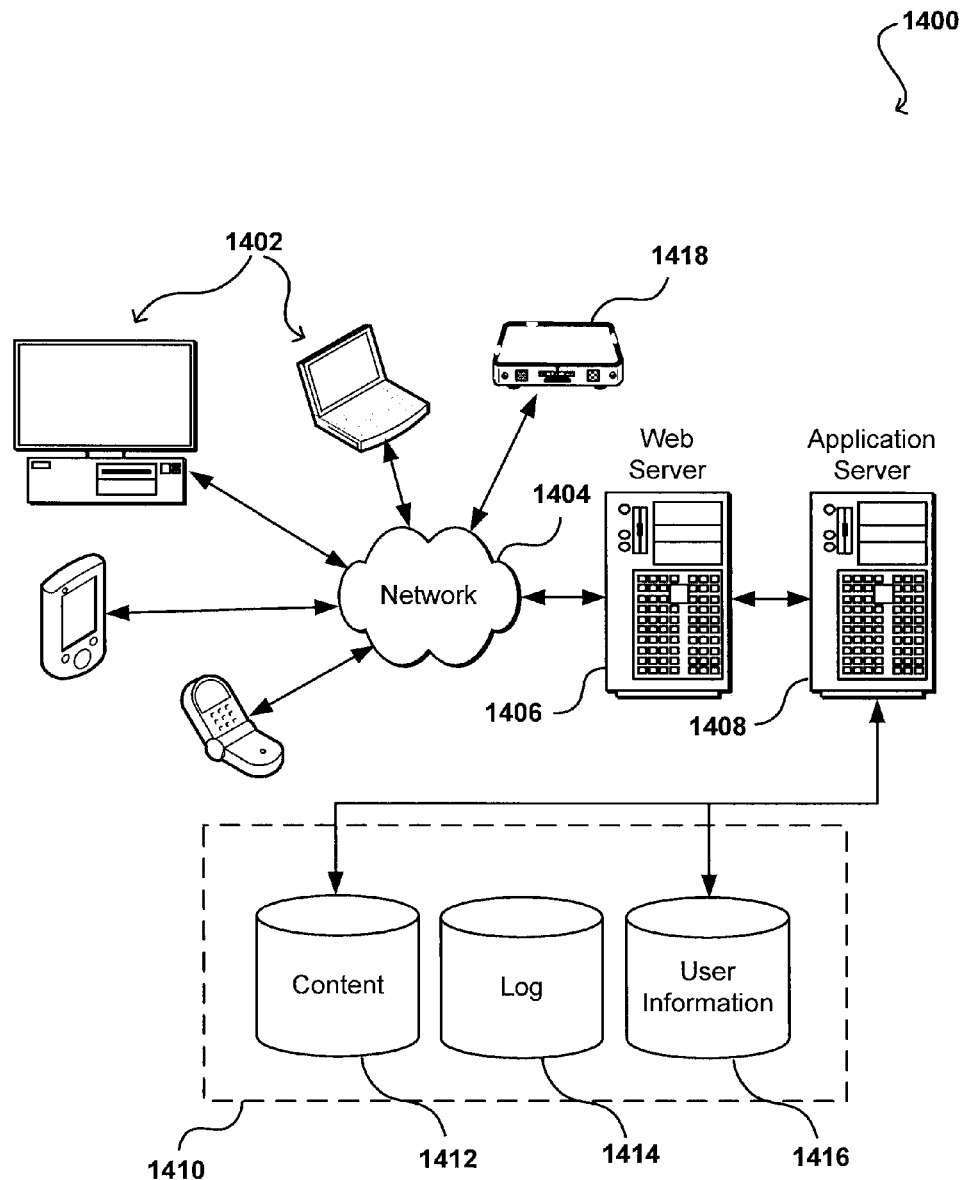
FIG. 14 illustrates an environment in which various embodiments can be implemented.

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic device 1402, which can include any appropriate device operable to send and receive requests, messages or information over an appropriate network 1404 and convey information back to a user of the device. Examples of such electronic devices include personal computers, cell phones, handheld messaging devices, laptop computers, set-top boxes, personal data assistants, electronic book readers and the like. The network can also communicate with devices such as a robotic device 1418 or charger (not shown), as discussed herein. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks, an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the electronic device 1402 and the application server 1408 can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1402. Information for a particular item of interest can be viewed in a dedicated page or window of the browser.

Each server will typically include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

As discussed above, the various embodiments can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices can also include other electronic devices, such as dummy terminals, thin-clients, gaming systems and other devices capable of communicating via a network.

Various aspects can also be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices will also typically include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of charging an electronic device, comprising:
   in response to determining, at a charging device, that the electronic device should be charged,
      determining a location of the electronic device with respect to the charging device;
      traversing, with the charging device, at least a portion of a path between a current location of the charging device and the determined location of the electronic device, wherein the charging device is configured to alter the path in response to detecting an object obstructing the path, wherein the charging device traverses the at least the portion of the path without human input;
      electronically coupling the charging device and the electronic device; and
      causing a power storage element of the electronic device to receive an electrical charge from the charging device.

2. The method of claim 1, wherein the charging device includes at least one imaging element, the location of the electronic device being determined at least in part by analyzing, using a processor, at least one image of the electronic device captured using the at least one imaging element.

3. The method of claim 1, wherein the location of the electronic device is determined at least in part by analyzing, using a processor, location information of the electronic device.

4. The method of claim 1, wherein traversing the at least the portion of the path between the current location of the charging device and the determined location of the electronic device includes utilizing mapping information for a surrounding environment.

5. The method of claim 1, further comprising:
   detecting the object obstructing the path using at least one sensor element of the charging device; and
   altering the path to avoid the object, wherein the altering is performed without human input.

6. The method of claim 1, wherein electronically coupling the charging device and the electronic device includes connecting a connector of the charging device with the electronic device.

7. The method of claim 1, wherein the charging device further includes a plurality of connectors, and wherein electronically coupling the charging device and the electronic device includes identifying a type of the electronic device and selecting at least one of the plurality of connectors based at least in part on the identified type of the electronic device.

8. The method of claim 1, further comprising:
receiving charge information from the electronic device, wherein the charging device is operable to provide the electrical charge to the power storage element of the electronic device based at least in part upon the charge information.

9. The method of claim 8, further comprising:
predicting a rate of power consumption of the electronic device over a future period of time based at least in part upon a past rate of power consumption,
wherein the charging device is able to cause the power storage element of the electronic device to receive the electrical charge based at least in part upon the predicted rate of power consumption.

10. The method of claim 1, wherein the charging device causes the power storage element of the electronic device to receive the electrical charge during a selected period of time.

11. The method of claim 1, wherein the charging device causes the power storage element of the electronic device to receive the electrical charge upon receiving a charge request from the electronic device.

12. The method of claim 1, wherein the charging device does not cause the power storage element of the electronic device to receive the electrical charge if the electronic device is determined to not require charging at a current time.

13. The method of claim 1, further comprising:
moving the electronic device to a respective location using the charging device.

14. The method of claim 1, further comprising:
delivering the electronic device to a user using the charging device in response to at least one of an event and a predicted event.

15. The method of claim 14, further comprising:
using at least one imaging element of the charging device to identify the user.

16. The method of claim 1, wherein causing the power storage element of the electronic device to receive the electrical charge includes charging the electronic device while the electronic device is within a proximity of the charging device, wherein the charging utilizes at least one of an inductive charging element, capacitive charging element and a physical connection.

17. The method of claim 1, wherein the charging device includes at least one power source, the method further comprising:
determining a power level of the power source;
if the determined power level of the power source is below a defined threshold level, coupling the charging device to an external power source without human input.

18. A method of charging an electronic device, comprising:
determining, using a power level determination component of the electronic device, a power level of the electronic device;
based at least in part upon the determined power level of the electronic device, determining whether the electronic device should be charged; and
when it is determined that the electronic device should be charged, sending a communication from the electronic device to a charging device indicating that the electronic device should be charged, wherein in response to receiving the communication, the charging device is configured to traverse at least a portion of a path between the electronic device and the charging device and without human input provide an electrical charge to the electronic device, wherein the charging device is configured to alter the path in response to detecting an object obstructing the path.

19. The method of claim 18, further comprising:
predicting an estimated power consumption for the electronic device over a determined period of time based in part upon at least one of the following:—behavioral information for a user of the electronic device, functionality executing on the electronic device, schedule information for the user, a location of the electronic device, a discharge rate of a power source of the electronic device, and historical usage data for the electronic device.

20. The method of claim 18, further comprising:
if it is determined that the electronic device should not be charged, determining a range of time during which the electronic device should be charged.

21. The method of claim 18, wherein the communication includes data identifying a location of the electronic device.

22. The method of claim 18, wherein the communication includes data identifying a time period during which the electronic device is available for charging.

23. The method of claim 18, wherein the communication includes a type identification of the electronic device.

24. A method of causing a first device to be charged, comprising:
under control of one or more computing systems configured with executable instructions,
receiving at least power information from the first device;
based at least in part upon the received power information, determining whether to charge the first device; and
if it is determined to charge the first device:
determining a position of the first device with respect to a second device;
traversing, with the second device, at least a portion of a path between a current position of the second device and the determined position of the first device, wherein the second device is configured to alter the path in response to detecting an object obstructing the path wherein the second device traverses the at least the portion of the path without human input; and
causing a power storage element of the first device to receive an electrical charge.

25. The method of claim 24, wherein the path between the current position of the second device and the determined position of the first device is determined at least in part on information received by the second device.

26. The method of claim 24, wherein causing the power storage element of the first device to receive the electrical charge includes connecting a connector of the second device with the first device.

27. The method of claim 24, further comprising:
transporting the first device to a determined location using the second device, without human input.

28. The method of claim 24, further comprising:
determining whether the first device is available for charging; and
if it is determined to charge the first device and it is determined that the first device is not available for charging, sending at least one command to the first device to alter a functionality of the first device to reduce power consumption.

29. An apparatus, comprising:
a housing;
a processor associated with the housing;
a drive element coupled with the housing, the drive element operable to cause the apparatus to traverse at least a portion of a path in response to instructions received from the processor;

a communication element operable to receive a signal from an electronic device; and memory including instructions which, when executed by the processor, cause the apparatus to:

determine that the electronic device should be charged;

determine a position of the electronic device with respect to the apparatus;

use the drive element to traverse the at least the portion of the path between a current position of the apparatus and the determined position of the electronic device, wherein the apparatus is configured to alter the path in response to detecting an object obstructing the path, wherein the apparatus traverses the at least the portion of the path without human input; and receive an electrical charge using a power storage element of the electronic device.

30. The apparatus of claim 29, wherein the instructions which, when executed by the processor, further cause the apparatus to:

receive the electronic device for transport; and transport the electronic device to a destination.

31. The apparatus of claim 29, further comprising:

at least one sensor element operable to detect the object along the path, wherein the processor is operable to alter the path to avoid the object without human input.

32. The apparatus of claim 29, further comprising:

at least one connector operable to connect with the electronic device.

33. The apparatus of claim 29, wherein the apparatus includes a plurality of connectors and wherein the apparatus is further operable to identify a type of electronic device and select at least one of the plurality of connectors based at least in part on the identified type of electronic device.

34. The apparatus of claim 29, further comprising:

at least one assembly operable to connect to an external power source in order to charge the apparatus.

35. The apparatus of claim 29, further comprising:

a power source, wherein the power source is operable to cause the power storage element of the electronic device to receive the electrical charge.

* * * * *